R. H. PLASS.
BAG MACHINE.
APPLICATION FILED NOV. 11, 1909.

1,054,867.

Patented Mar. 4, 1913.

18 SHEETS—SHEET 3.

Witnesses:
Inventor
Robert H. Plass
By his Attorney
Henry M. Bingham

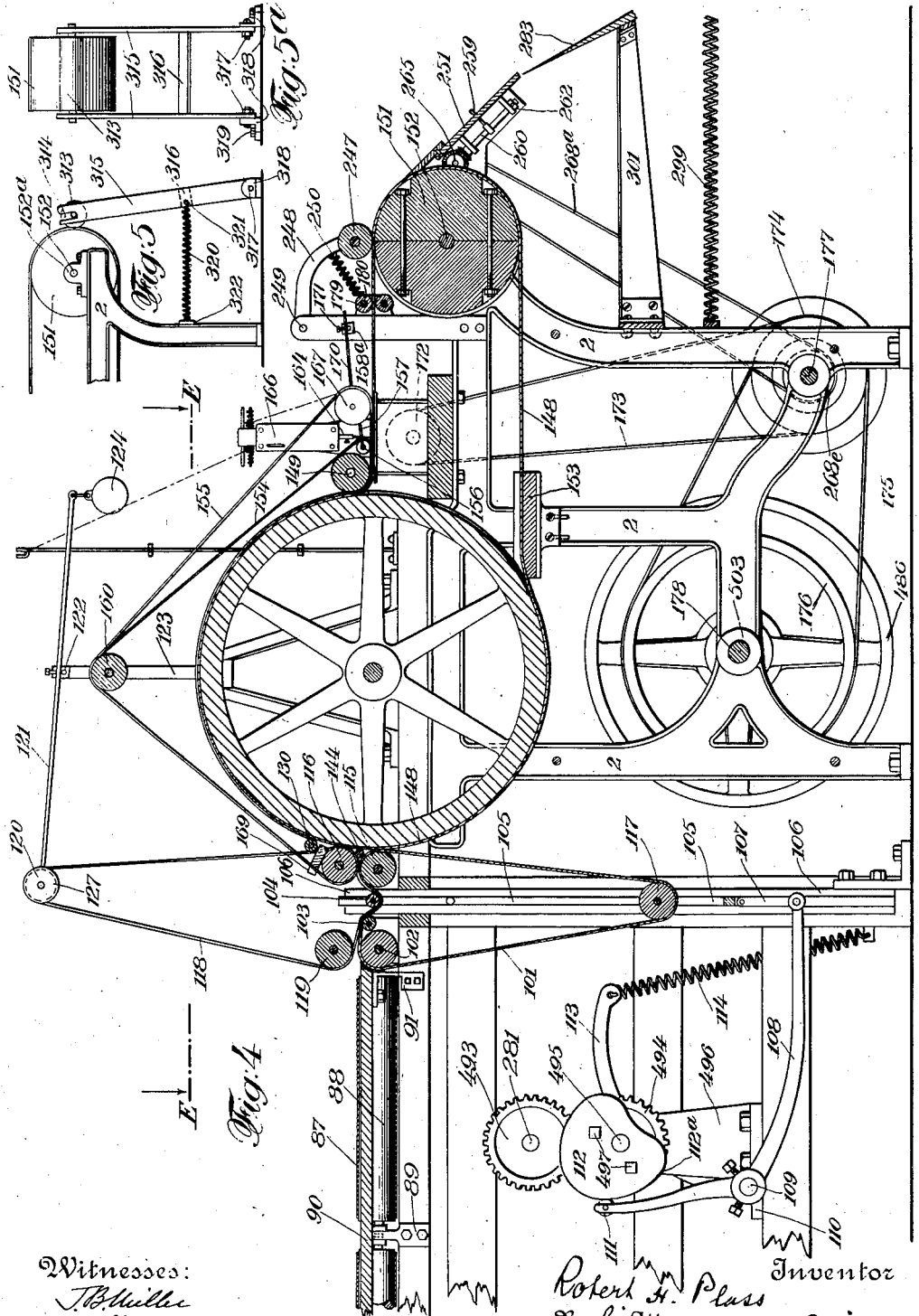

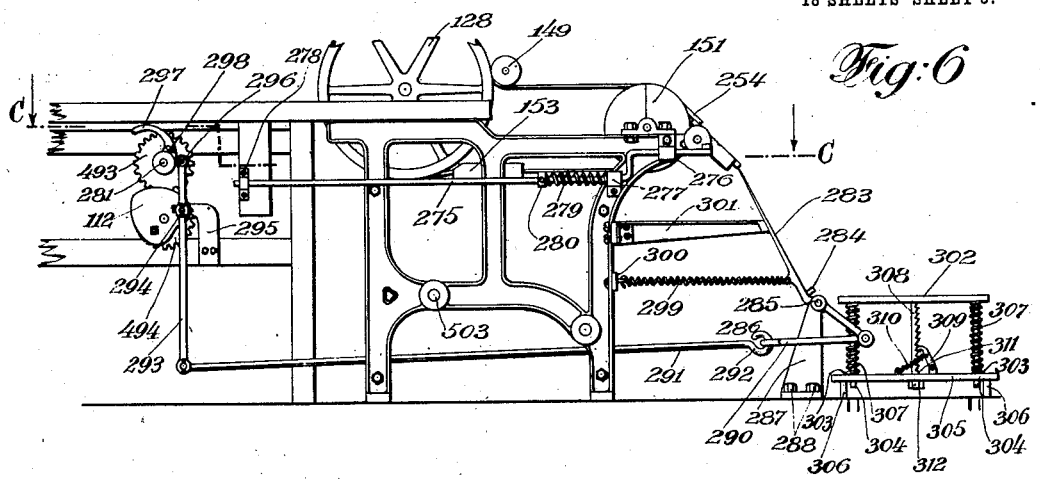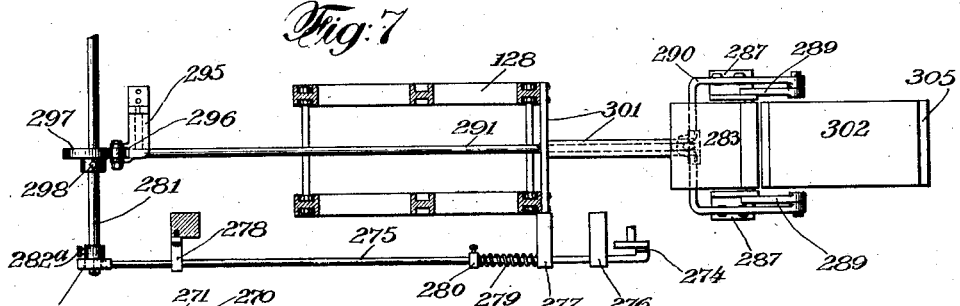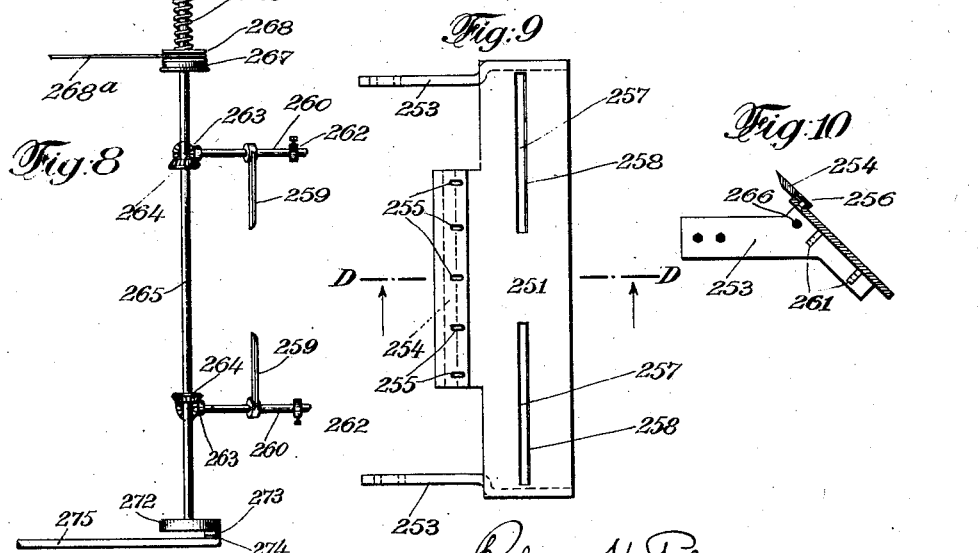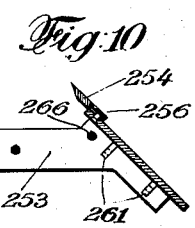

R. H. PLASS.
BAG MACHINE.
APPLICATION FILED NOV. 11, 1909.

1,054,867.

Patented Mar. 4, 1913.
18 SHEETS—SHEET 6.

Witnesses:
J. B. Miller
E. J. Wheat

Inventor
Robert H. Plass
By his Attorney
Henry M. Bingham

R. H. PLASS.
BAG MACHINE.
APPLICATION FILED NOV. 11, 1909.
1,054,867.
Patented Mar. 4, 1913.
18 SHEETS—SHEET 7.
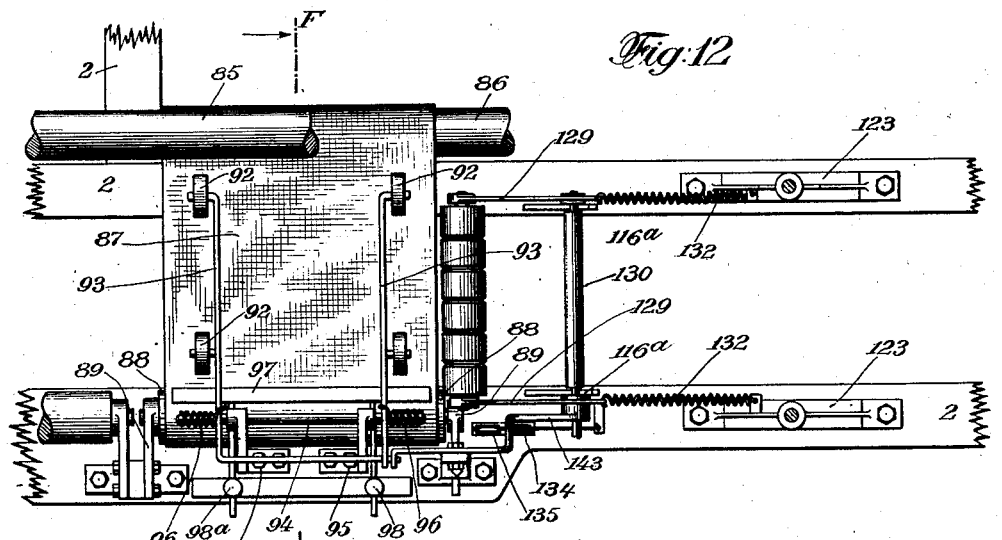
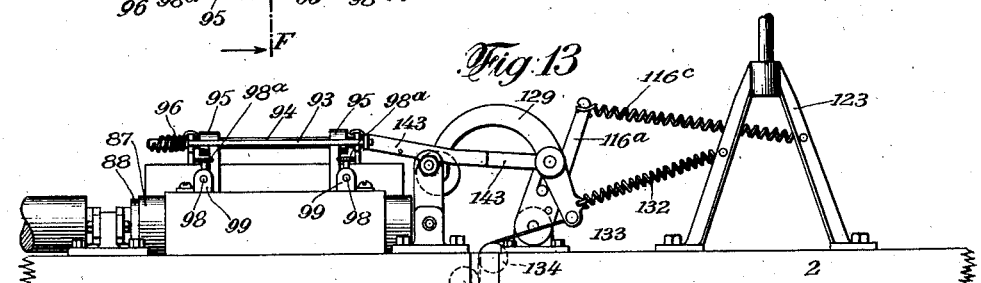
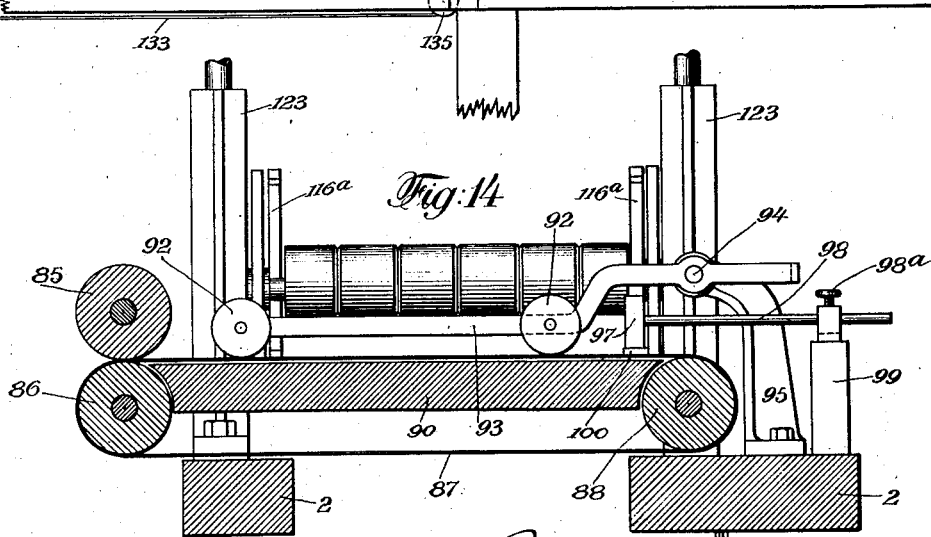
Witnesses:
J. B. Miller
E. J. Wheat.
Robert H. Plass   Inventor
By his Attorney
Henry M. Brigham

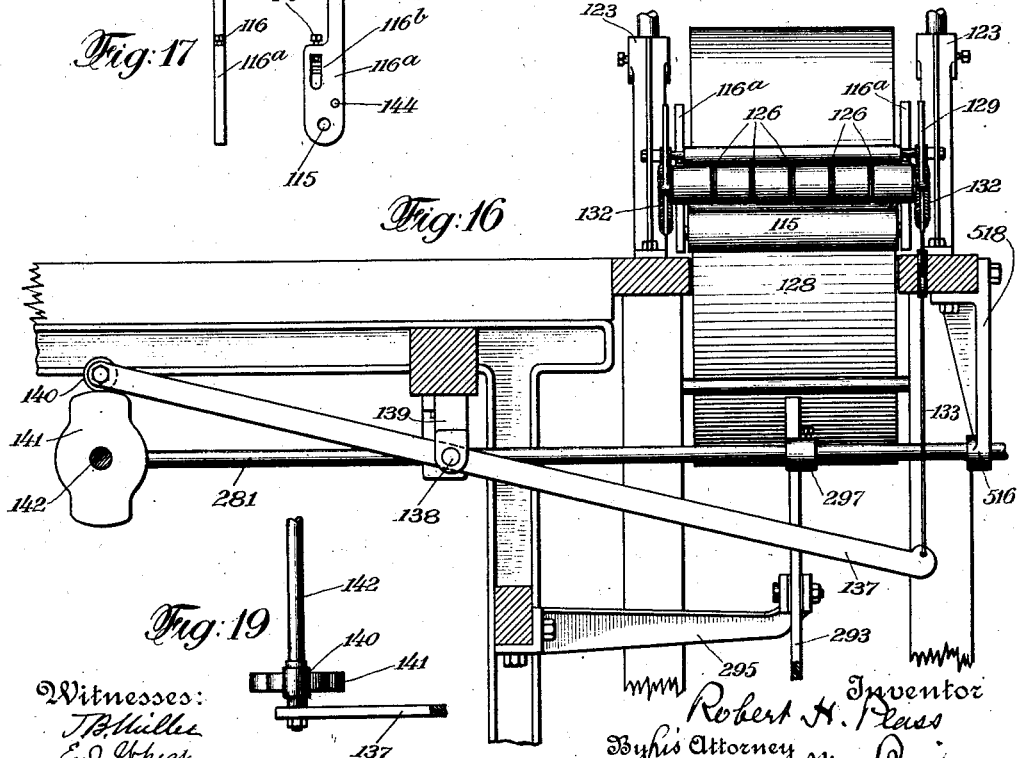

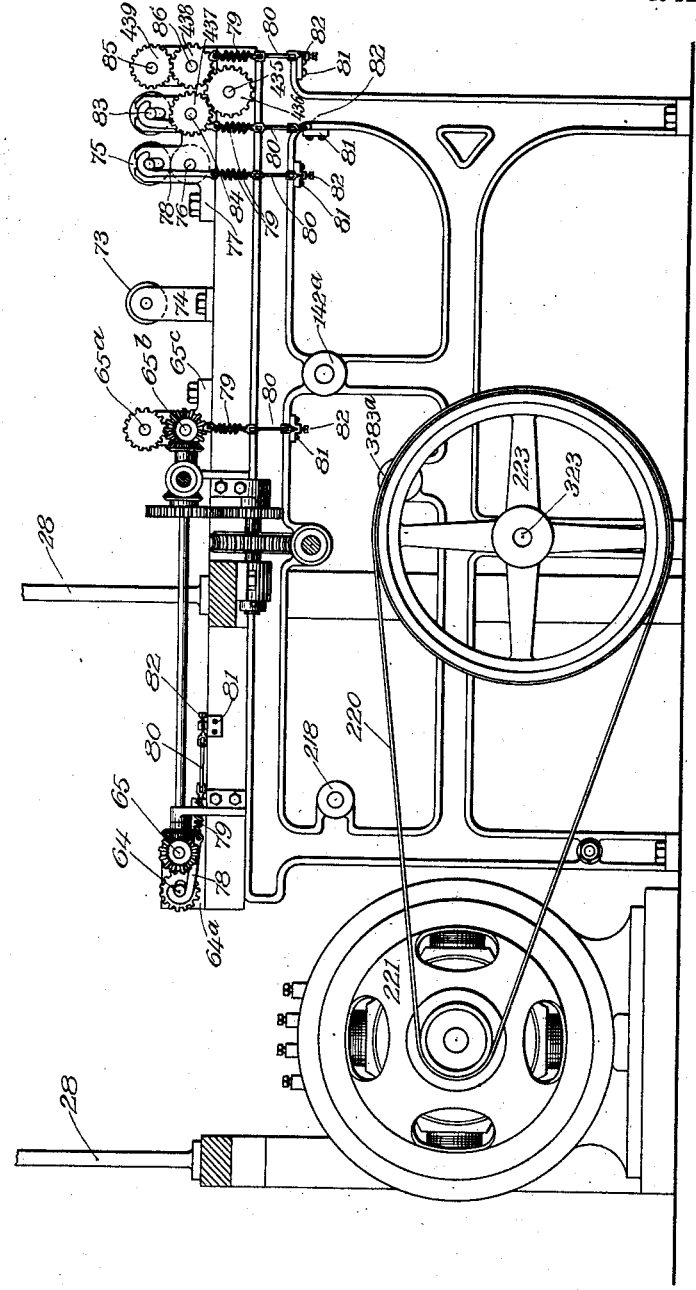

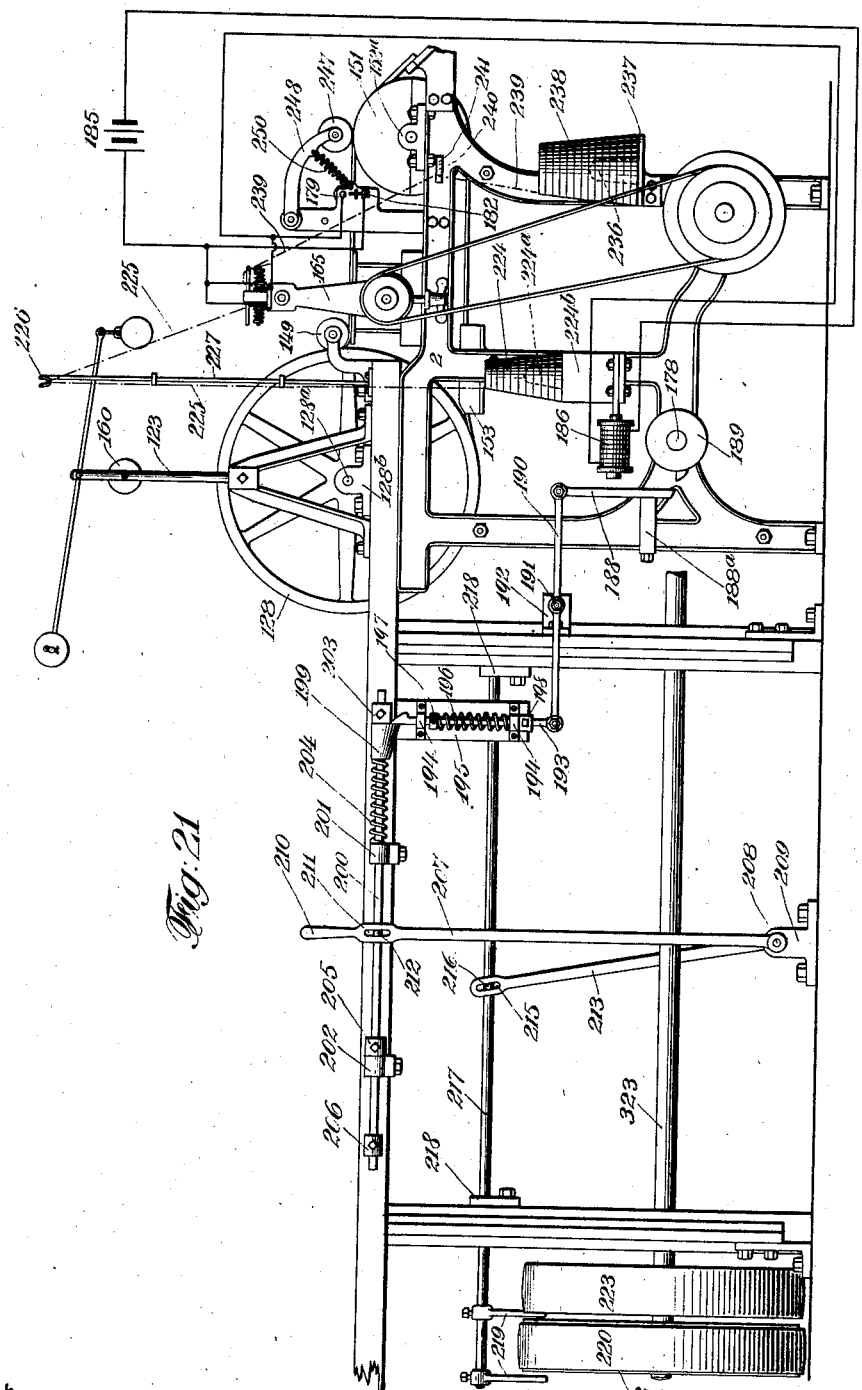

R. H. PLASS.
BAG MACHINE.
APPLICATION FILED NOV. 11, 1909.

1,054,867.

Patented Mar. 4, 1913.
18 SHEETS—SHEET 11.

Witnesses:

Robert H. Plass, Inventor
By his Attorney

R. H. PLASS.
BAG MACHINE.
APPLICATION FILED NOV. 11, 1909.
1,054,867.
Patented Mar. 4, 1913.
18 SHEETS—SHEET 12.
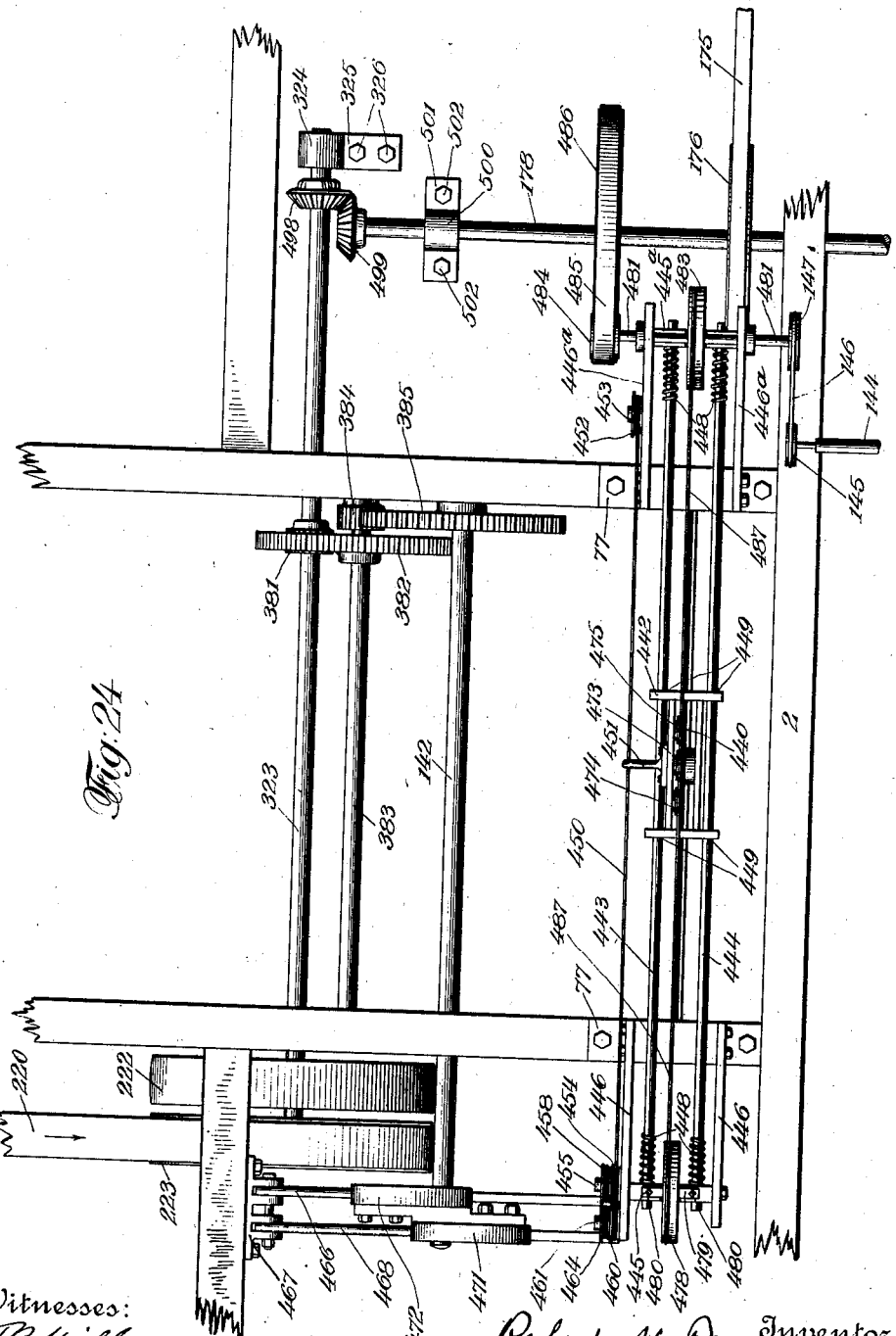

R. H. PLASS.
BAG MACHINE.
APPLICATION FILED NOV. 11, 1909.
1,054,867.
Patented Mar. 4, 1913.
18 SHEETS—SHEET 13.
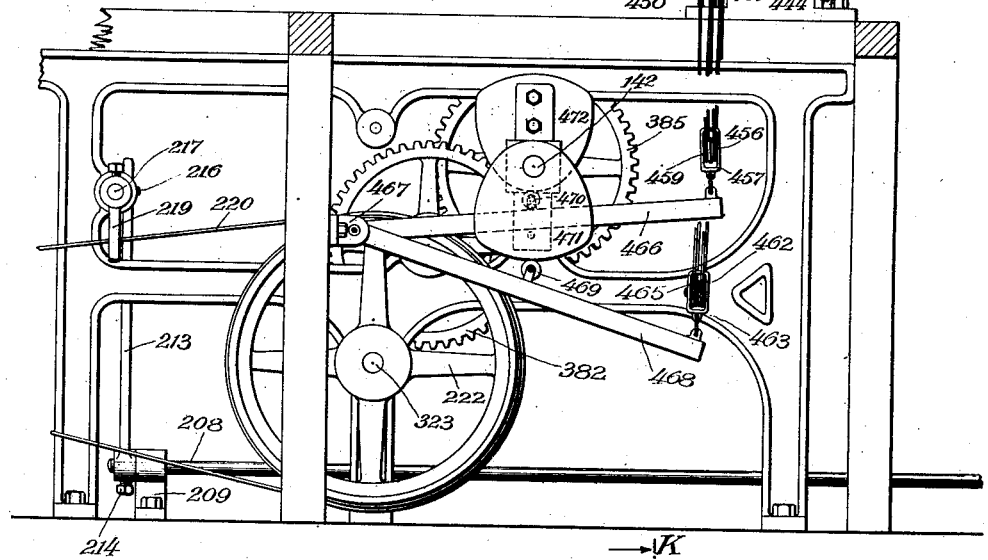
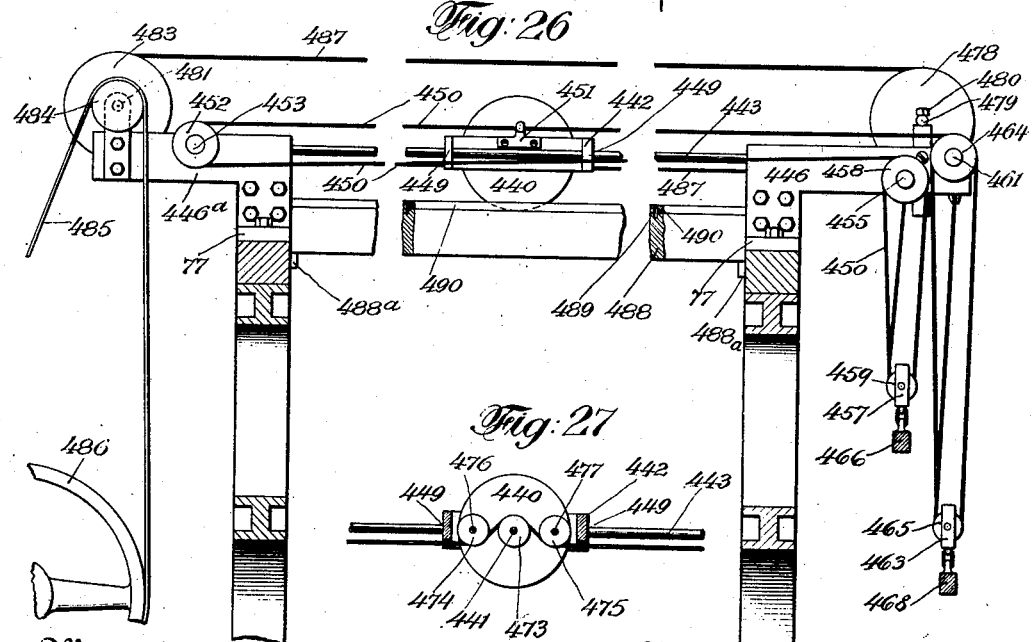

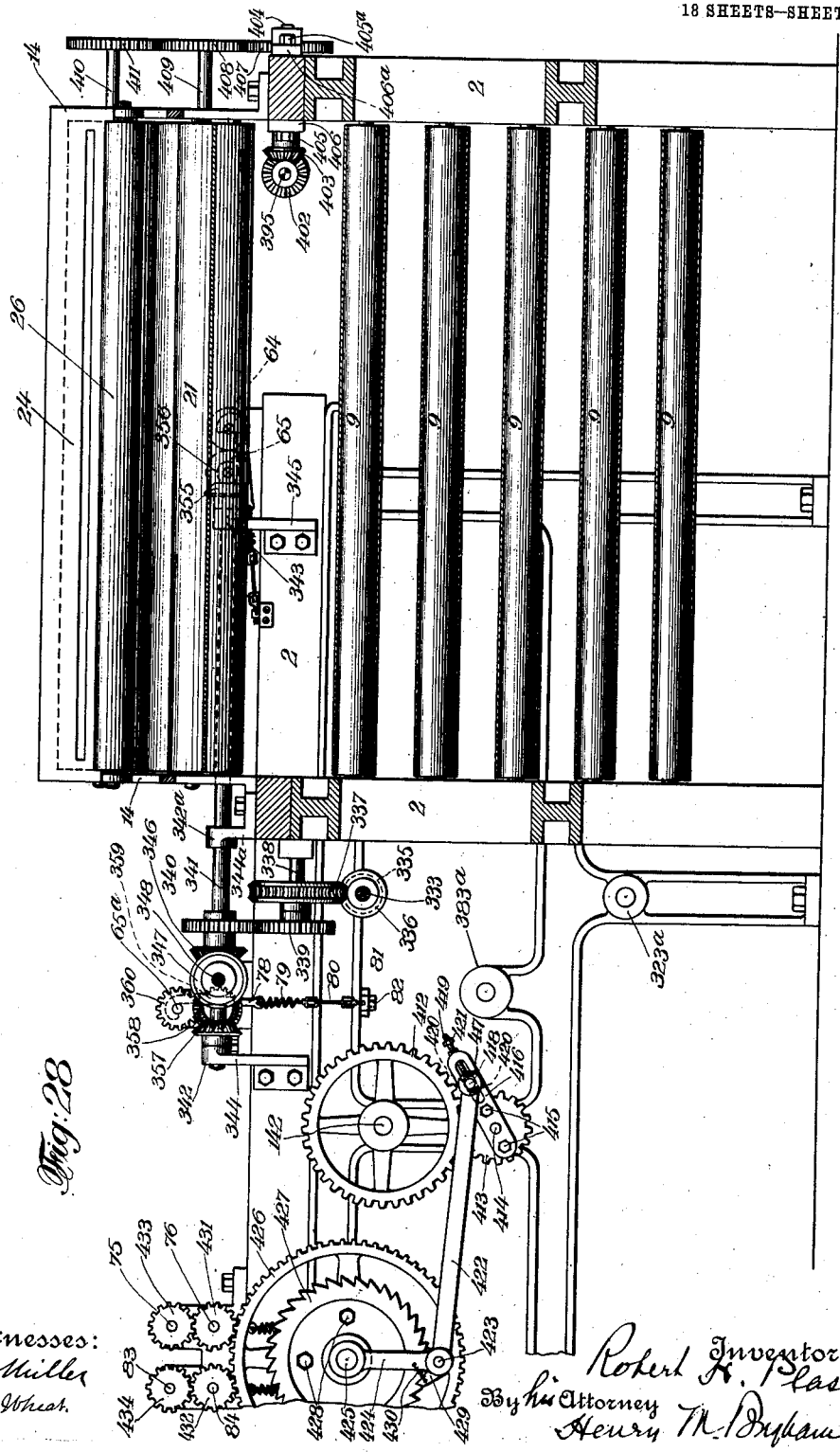

R. H. PLASS.
BAG MACHINE.
APPLICATION FILED NOV. 11, 1909.
1,054,867.
Patented Mar. 4, 1913.
18 SHEETS—SHEET 15.
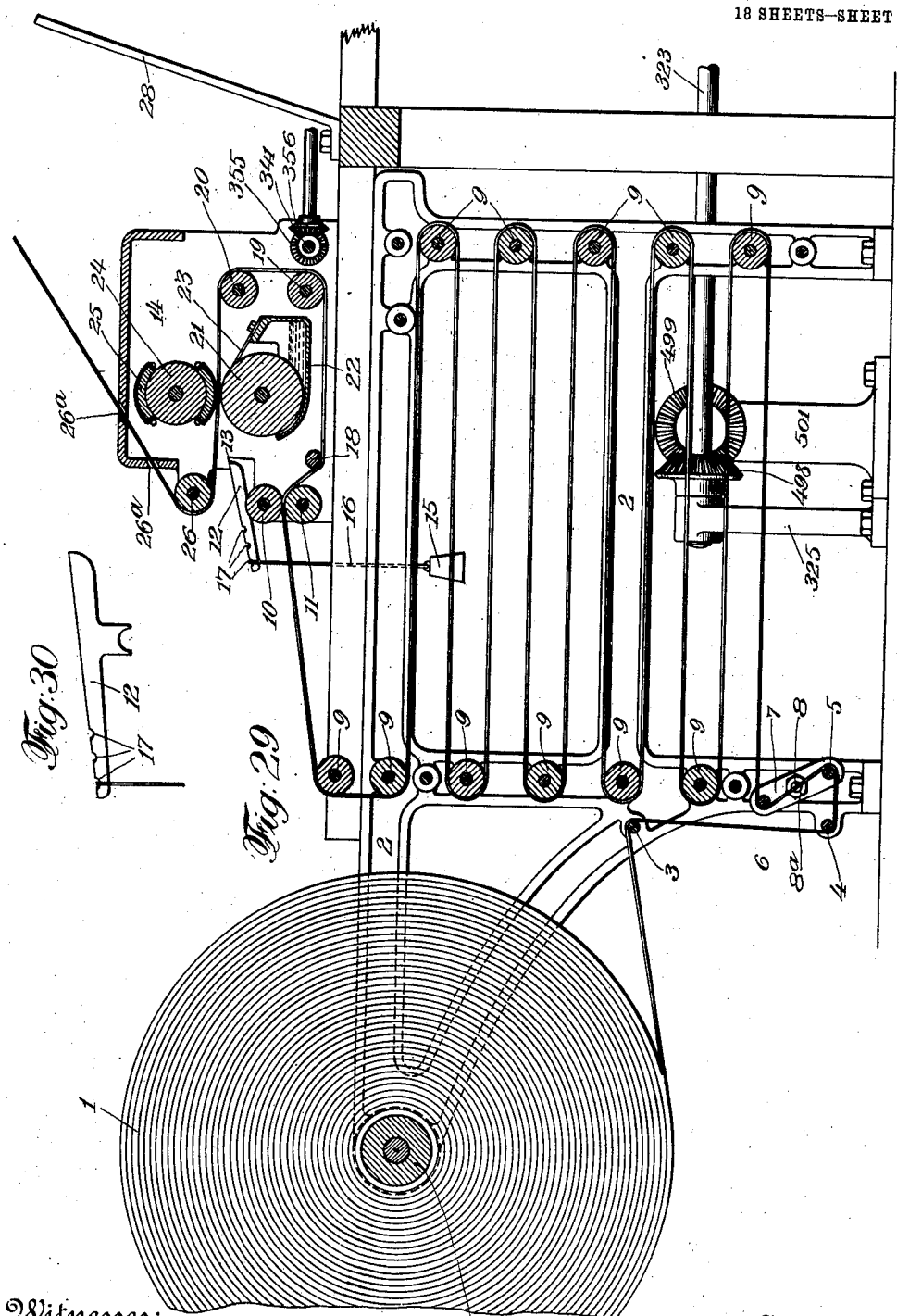

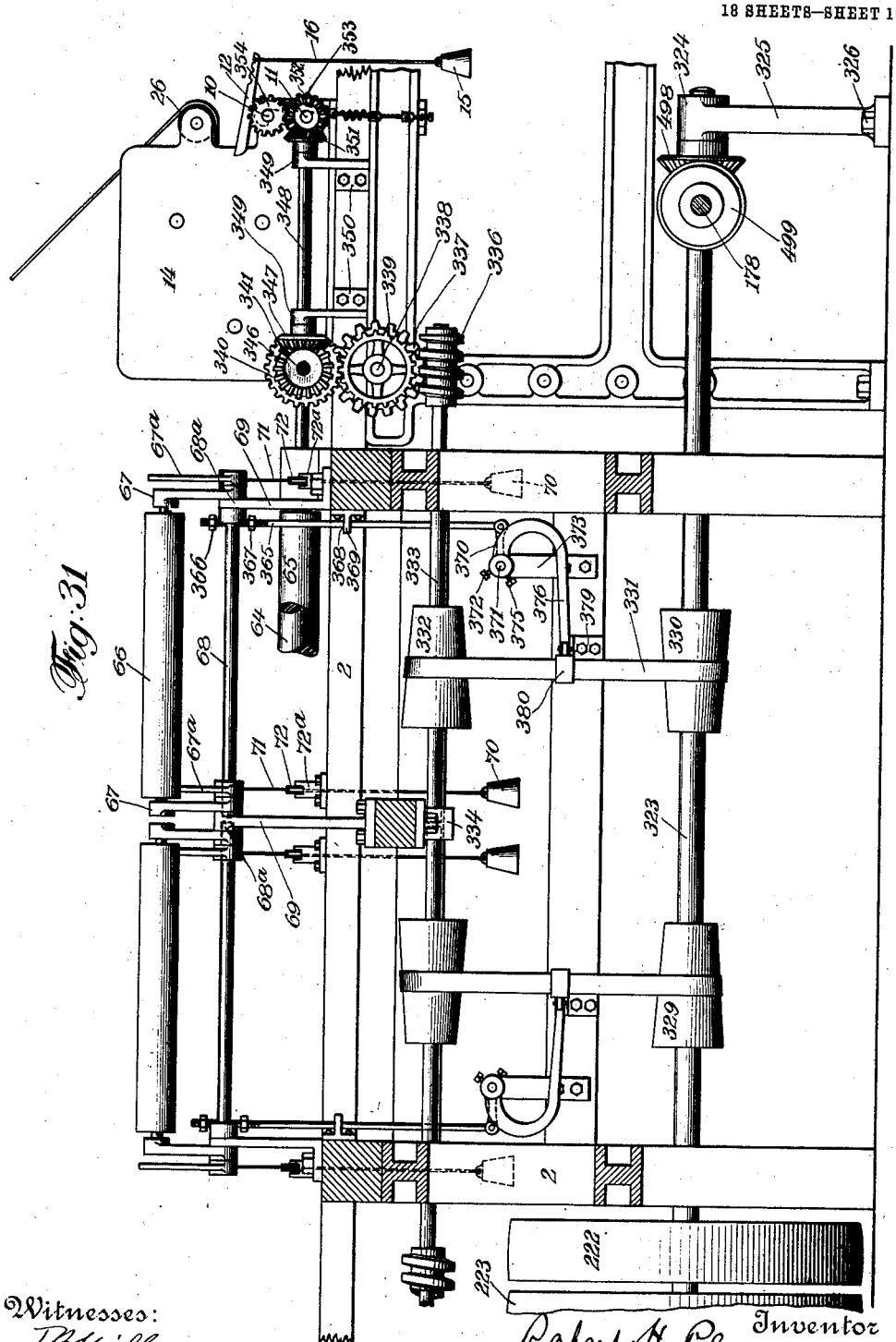

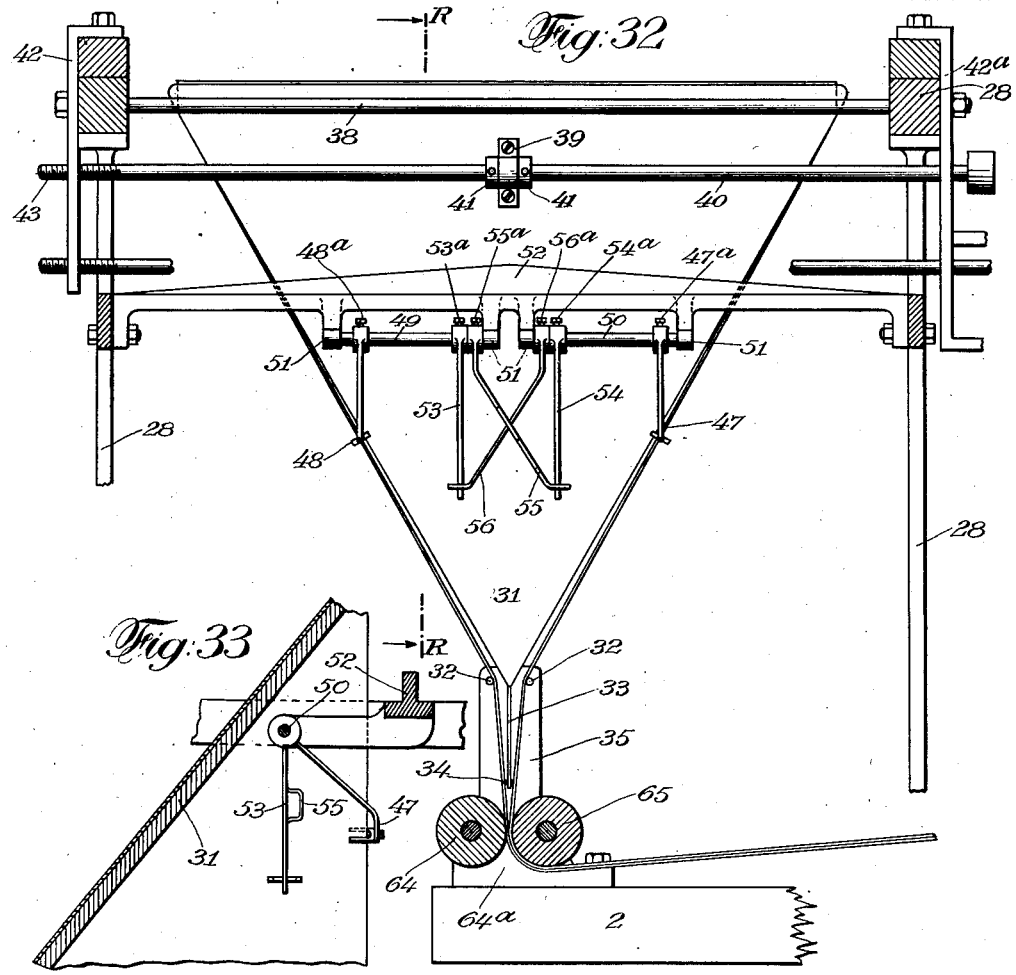

R. H. PLASS.
BAG MACHINE.
APPLICATION FILED NOV. 11, 1909.

1,054,867.

Patented Mar. 4, 1913.
18 SHEETS—SHEET 18.

Witnesses

Inventor
Robert H. Plass
By Attorneys

UNITED STATES PATENT OFFICE.

ROBERT H. PLASS, OF STAPLETON, NEW YORK, ASSIGNOR OF ONE-HALF TO J. ROSS COLLINS, OF LARCHMONT, NEW YORK.

BAG-MACHINE.

1,054,867.      Specification of Letters Patent.      Patented Mar. 4, 1913.

Application filed November 11, 1909. Serial No. 527,557.

*To all whom it may concern:*

Be it known that I, ROBERT H. PLASS, a subject of the German Emperor, residing at Stapleton, in the county of Richmond and State of New York, have invented new and useful Improvements in Bag-Machines, of which the following is a specification.

My invention relates to bag machines and the object of my invention is to produce an automatic mechanism which will print, fold, cut and sew fabric into bags.

In the accompanying drawings I have shown a double machine but have omitted many of the duplicate parts.

Figure 1:
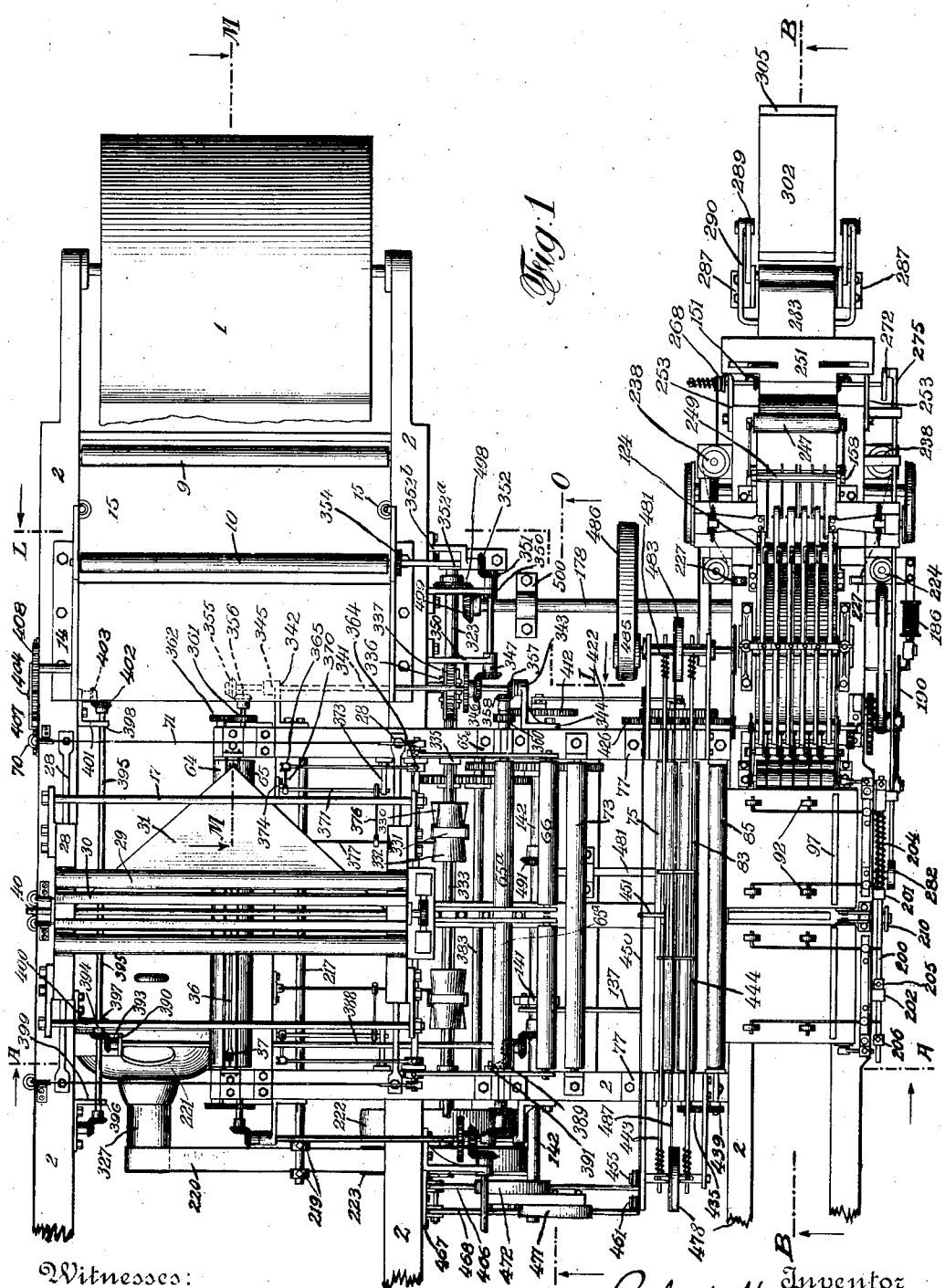
Figure 2:
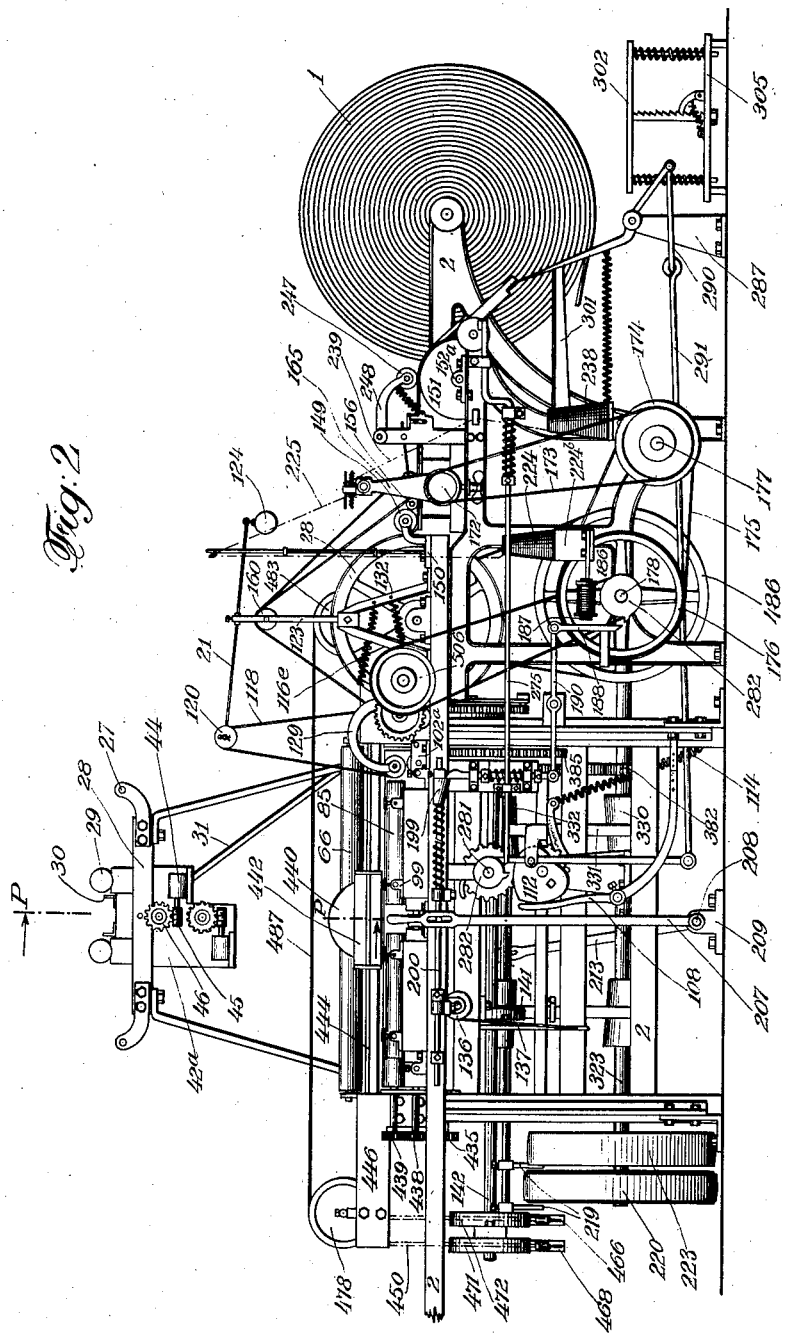
Figure 3:
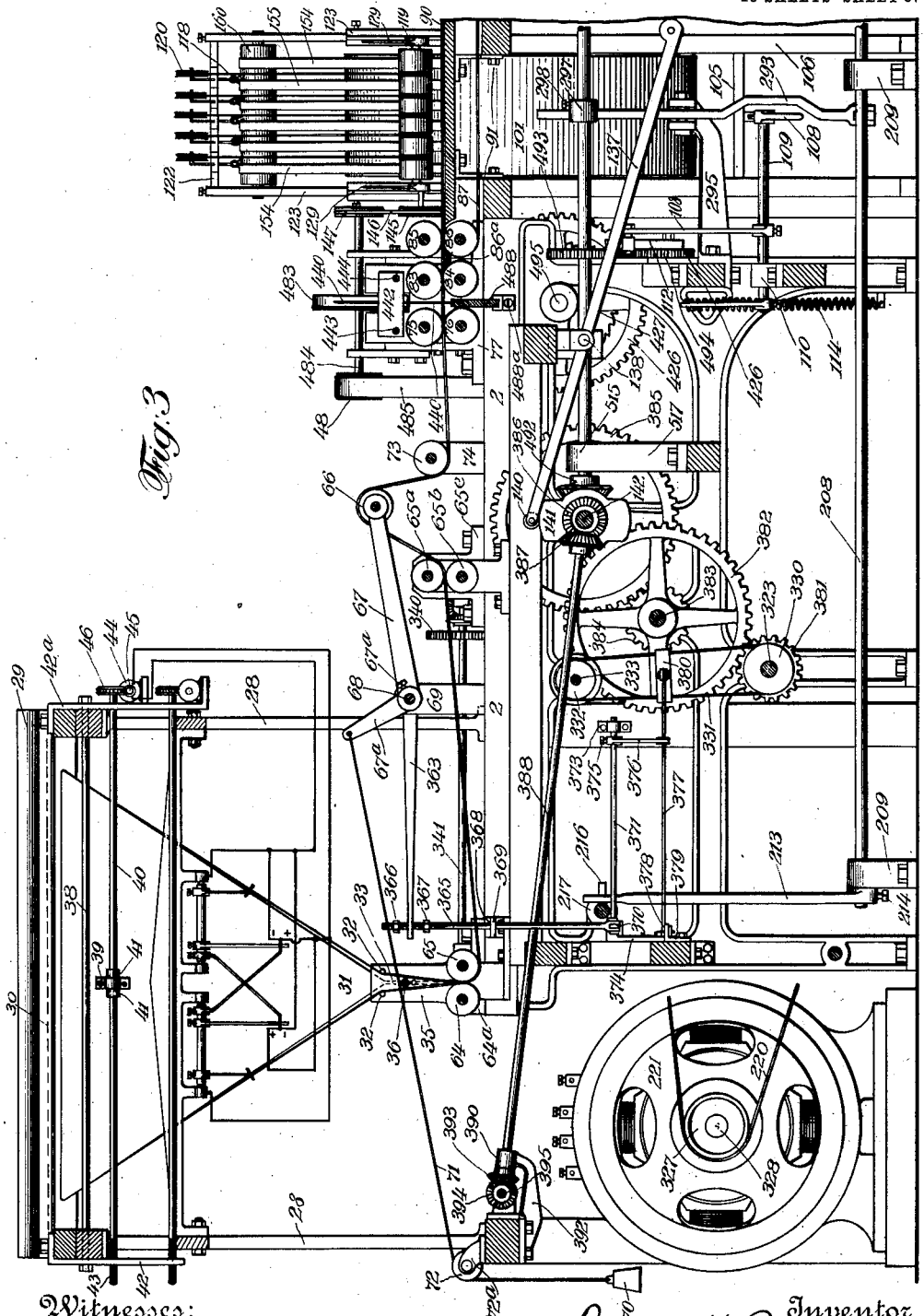
Figure 11:
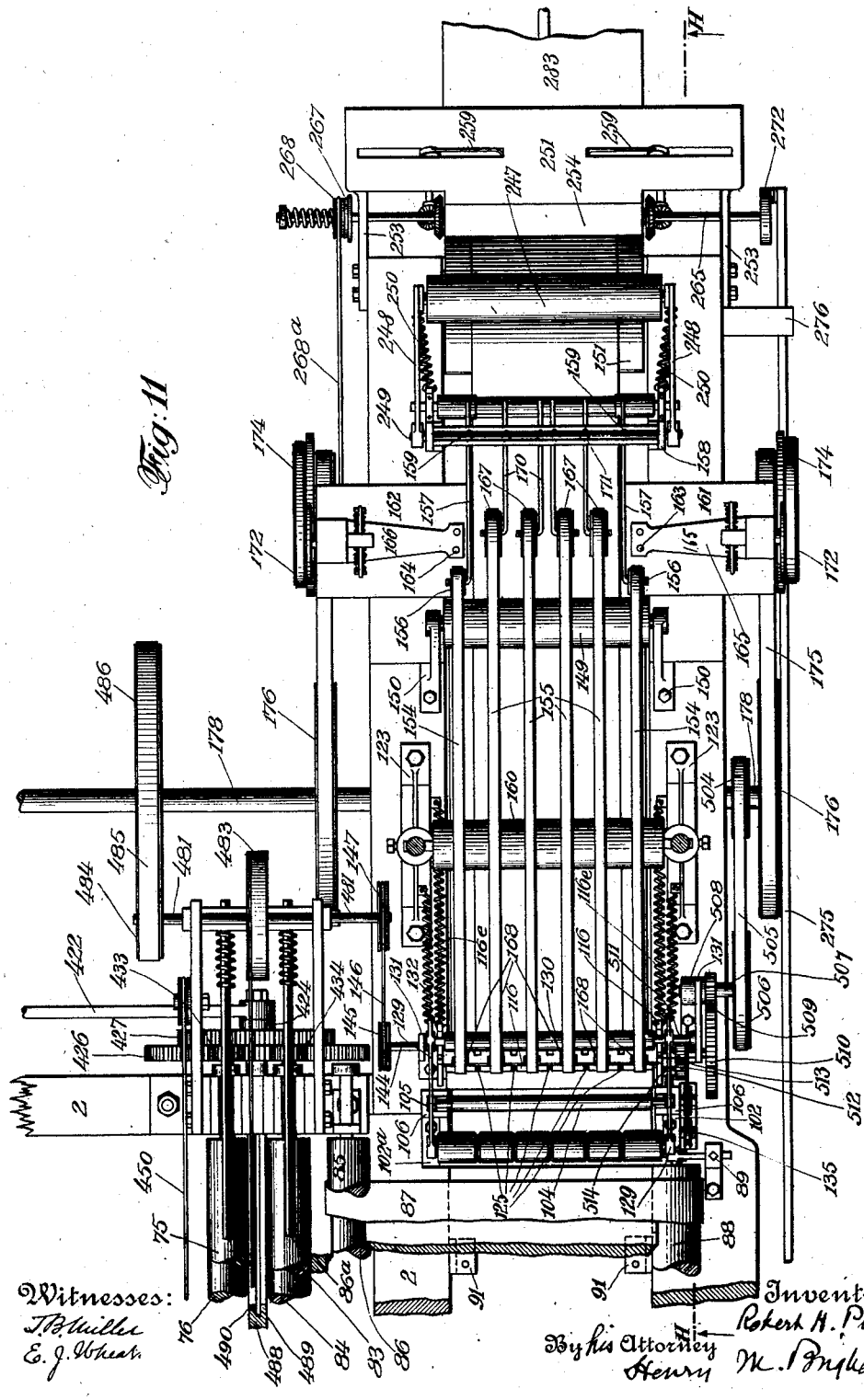
Figure 22:
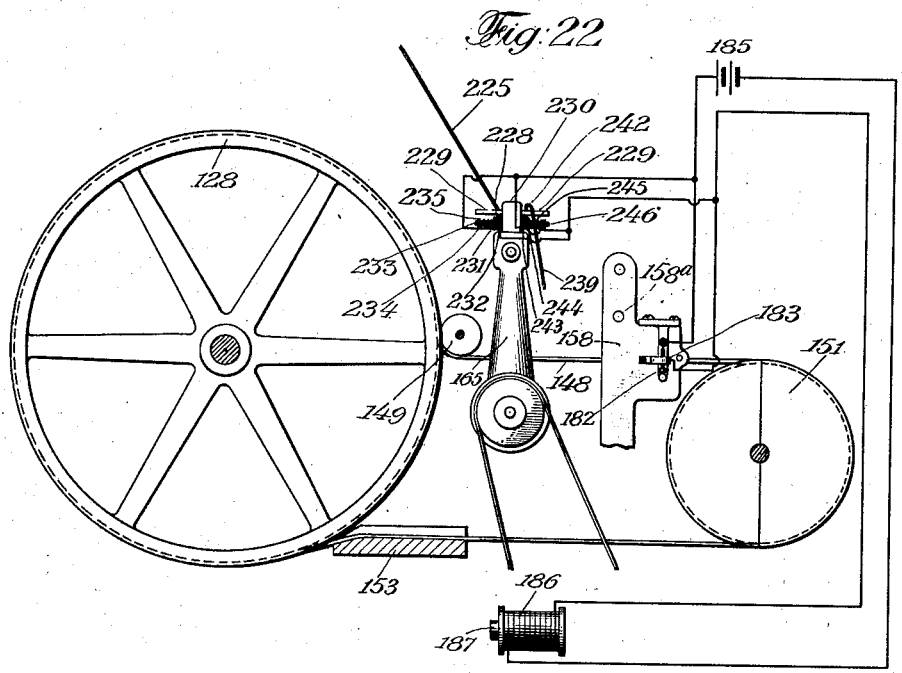
Figure 23:
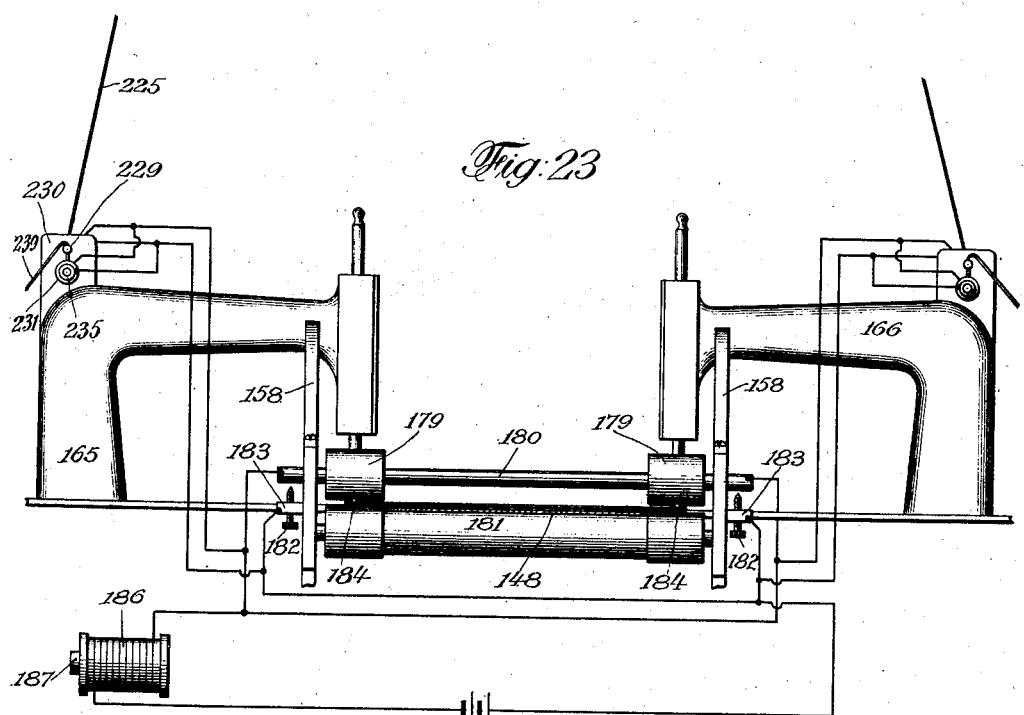
Figure 34:
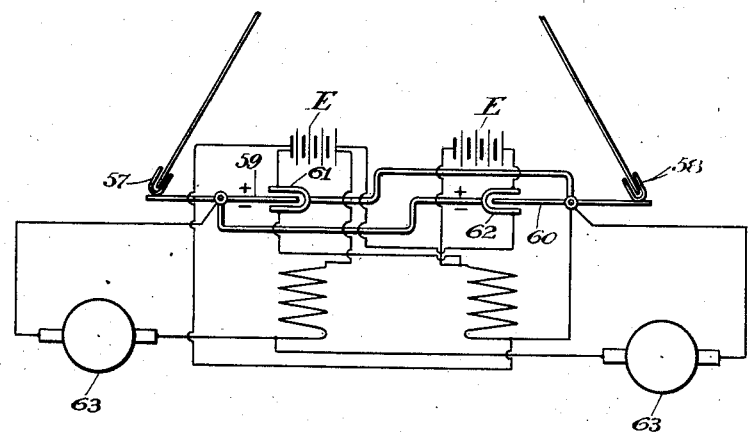
Figure 35:
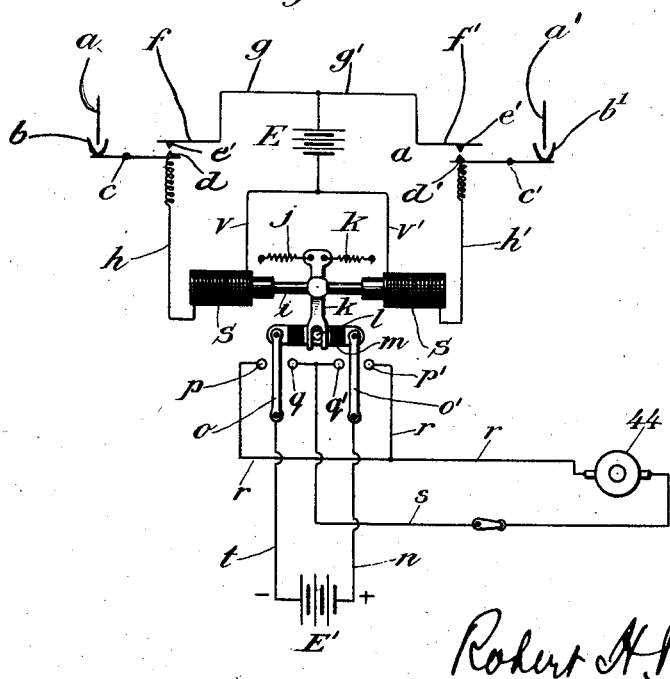

Figure 1. is a plan view of my mechanism with the printing press removed in order that other parts of the mechanism may be more clearly shown. Fig. 2. is a front elevation of my mechanism. Fig. 3. is a sectional view on the line A—A of Fig. 1. Fig. 4. is a sectional view on the line B—B of Fig. 1. Fig. 5. is a side elevation of a modification of the mechanism for delivering the completed bags. Fig. 5ª. is a front elevation of the same mechanism. Fig. 6. is an elevation partly broken away showing the mechanism for separating and piling the completed bags. Fig. 7. is a sectional view on the line C—C of Fig. 6. Fig. 8. is a detail view of a portion of the mechanism for cutting the threads which secure the bags to each other. Fig. 9. is a detail plan view of the frame of the mechanism for cutting the threads which secure the bags to each other. Fig. 10. is a sectional view on the line D—D of Fig. 9. Fig. 11. is an enlarged plan view of the mechanism for conveying the bags to the sewing machines, the sewing machines and cutting device for separating the bags—partly in section. Fig. 12. is an enlarged detail plan view of the bag guiding rolls. Fig. 13. is a front view of the bag guiding rolls. Fig. 14. is a sectional elevation view on the line F—F of Fig. 12. Fig. 15. is a sectional view on the line H—H of Fig. 11. Fig. 16. is a sectional view on the line I—I of Fig. 15. Fig. 17. is a side view of the bearing plate 116ª. Fig. 18. is a face view of bearing plate 116ª. Fig. 19. is a top view of the cam and roller shown in Fig. 16. Fig. 20. is a side elevation showing the motor and mechanism by which certain of the rolls are driven. Fig. 21. is a view of the electrical mechanism by which the machine is automatically stopped when either of the threads with which the bags are sewed are broken. Fig. 22. is a detail front view of the electrical stopping mechanism. Fig. 23. is a detail end view of the electrical stopping mechanism. Fig. 24. is a plan view of the mechanism for cutting the folded fabric into segments of the dimensions of the bags. Fig. 25 is an end view of the mechanism for cutting the fabric into segments. Fig. 26 is a sectional view taken on the line K—K of Fig. 25 partly broken away. Fig. 27 is a detail view of the mechanism by which the cutting disk is rotated. Fig. 28 is a view partly in section on the line L—L of Fig. 1 showing a part of the driving mechanism. Fig. 29 is a sectional view on the line M—M of Fig. 1 showing the printing rolls and the mechanism for stretching the cloth before it passes to the printing rolls. Fig. 30 is an enlarged view of the pressure lever 12. Fig. 31 is a sectional view taken on the line O—O of Fig. 1 showing the speed regulating mechanism for controlling the feed of the web of cloth from the printing press to the cutting mechanism. Fig. 32 is a detail sectional view on the line P—P of Fig. 2 showing the folding mechanism and electrical mechanism for maintaining the folder in the center of the web of cloth. Fig. 33 is a sectional view on the line R—R of Fig. 32. Fig. 34 is a diagrammatic view of the electrical mechanism for maintaining the folder in the center of the web of cloth. Fig. 35 is a diagrammatic view of the switch mechanism for reversing the motor.

In the accompanying drawings similar letters of reference refer to similar parts.

The fabric is fed to the machine from a roll 1 which is supported on a roller 1ª mounted in suitable bearings in the frame 2 of the machine. From the roll the web of cloth passes over a rod 3 and under another rod 4 both of which are secured in the frame against rotation. From thence it passes under the rod 5 and over the rod 6, these rods being mounted against rotation in opposite ends of the corresponding plates 7 secured to either side of the frame 2 by bolts 8 and lock-nuts 8ª. This construction renders it possible to adjust and secure the plates 7 in any desired position and thus regulate the tension on the web of cloth; from thence the cloth is carried over a series of idle rolls 9 mounted in suitable bearings in the frame 2, and adapted to rotate therein; thence between the feed rolls 10 and 11, mounted in suitable bearings in the frame 14.

Resting on the top of the feed roll 10 are levers 12 one end of which engages with shoulders 13 on the frame 14 of the printing press. To the outer end of the lever is secured a weight 15 by means of a cable 16 which is secured in notches 17, the pressure of the lever being regulated by shifting the cable to the desired notch in the lever. By the mechanism described, the pressure of the roll 10 upon the fabric passing under the roll 10 and over the roll 11 is regulated so as to compel the fabric to feed with the rotation of the rolls. From thence the fabric passes under the rod 18 which is secured against rotation in the frame 14 of the printing press, under the idle roll 19, over the idle roll 20 and over the driven printing roll 21 all of which rolls are mounted in suitable bearings in the frame 14. The roll 21 is engraved with the matter to be printed upon the fabric and is mounted in a trough 22 secured to the frame 14 and partially filled with ink. On one side of this trough is mounted a scraper 23 which plays against the surface of the printing roll and removes therefrom any surplus ink which may adhere to the surface thereof. Mounted just above the printing roll 21 is a driven roll 24 provided with flexible shoes 25 of rubber or other suitable material adapted to force the fabric against the surface of the printing roll 21, whenever an impression is to be printed upon the fabric, and as these shoes do not extend all around the roll 24, the tension on the fabric will lift it away from the roll 21 at all other times. The roll 24 is mounted in suitable bearings in the frame 14. From thence the fabric passes around the idle roll 26 mounted in suitable bearings in the frame 14 through slots 26ª and over the rod 27 which is non-rotatably mounted in a frame 28, supported on the main frame of the machine, thence over the rod 29 which is mounted on said frame 28 against rotation; thence it passes over the angle iron 30 and over the triangular folding former 31 and between the folding rods 32. Depending from the triangular former 31 is a blade 33 which is provided with a pin 34 passing through the lower end thereof. Extending from a bracket 35 supported on the main frame 2 is a rod 36 having a forked end 37 through which the end of the blade 33 extends until the pin 34 rests upon the upper face thereof. This forms a support for the folder 31, the upper rear surface of which rests against a rod 38 supported in the frame 28.

It is apparent that in order to fold the fabric along the middle line thereof that the center line of the web must be maintained at the lower point of the triangular former. In order to accomplish this result a bracket 39 is mounted on the back of the triangular former 31 and through a suitable opening in this bracket is passed a rod 40 provided with set-rings 41. The rod 40 is also mounted in suitable bearings in plates 42 and 42ª secured to the frame 28 and one end of the rod 40 is screw-threaded at 43. Secured to the plate 42ª is a small electric motor 44, the shaft of which is provided with a worm 45 adapted to mesh with a gear 46 which is provided with a female thread adapted to engage with the thread 43 on the shaft 40, the gear 46 being locked in position by engagement with the shaft of the motor.

It is apparent that the rotation of the motor in one direction will cause the upper end of the folder 31 to be shifted or tilted from its normal position with the rotation and shifting of the rod 40, and that when the motor is rotated in the opposite direction, the rod 40 will be rotated and shifted and the folder 31 shifted or tilted in the opposite direction. This shifting or tilting of the former 31 causes the web of cloth to shift across its surface and by the proper shifting or tilting of the former 31 the lower forming point thereof may be always maintained at the center line of the web.

In order to provide automatic means for accomplishing this result, I have provided trailing fingers 47 and 48 which are adapted to rest lightly by gravity upon the edges of the fabric folded over the former 31. These fingers are respectively mounted on shafts 49 and 50 and secured thereto by set-screws 47ª and 48ª. The shafts 49 and 50 are mounted in suitable bearings 51 secured to a brace 52 mounted on the frame 28. Also secured to said shafts 49 and 50 by set-screws 53ª and 54ª are light depending rods 53 and 54 each of which forms part of an electrical circuit. Secured in like manner to the shafts 49 and 50 by set-screws 55ª and 56ª but insulated therefrom by suitable insulating material are light depending arms 55 and 56 provided with forked ends, each finger of said forks being insulated from the other finger of the same fork and each finger forming part of an electric circuit. The forked rod 55 is so mounted that the end of the rod 54 will pass between the fingers on the forked end thereof but will normally be out of engagement therewith, and the rod 56 is so mounted that the end of the depending rod 53 will pass between the fingers on the forked end thereof but will be normally out of engagement therewith, and the forked rods 55 and 56 are so off-set that they will not contact with each other. From this construction it is apparent that whenever the point of the folder 31 does not press against the center line of the fabric, and more than one half of the web is passing around one side of the folder as for instance on the side on which the finger 47 is mounted that finger will be lifted together with the rods 54 and 56 so that the rod 54 will contact with the outer branch of the fork on the rod 55 and the inner branch of the fork on the rod 56 will contact with the rod 53 causing the motor to rotate in the direction which will tilt the upper end of the folder toward the motor and thus cause the web to shift over the face of the folder until the lower pointed end thereof is against the center line of the fabric, when the finger 47 will fall to its normal position the circuit will be broken and the motor will cease to operate.

Whenever the center line of the web is at the left of the lower pointed end of the folder 31 the finger 48 will be lifted together with the depending rod 53 and the forked rod 55 until the end of the rod 53 contacts with the outer branch of the fork on the rod 56 and the inner branch of the forked rod 55 contacts with the end of the rod 54 when the motor will rotate in the opposite direction and tilt the upper end of the folder 31 away from the motor until the lower pointed end of the former is again at the center line of the web of fabric when the finger 48 will fall to its normal position the contacts will be broken and the motor will cease to rotate. It is apparent that the mechanism described will always maintain the folder 31 in such position that the lower pointed end thereof will trail over the center line of the web of fabric and that this will be the result obtained even if the web varies in width which would only result in the fingers 47 and 48 rising and falling together.

In order to show more clearly the operation of the automatic mechanism just described, I have illustrated the same in diagrammatic form in Fig. 34 in which 57 and 58 represent the trailing fingers 47 and 48 and 59 and 60 the depending rods 53 and 54 and 61 and 62, the forked rods 55 and 56.

E E indicates sources of electricity.

In the diagrammatic view shown in Fig. 35 the motor 44 is reversed by switch mechanism. In this figure $a$ indicates the edges of the web of cloth $b$, $b'$ the trailing fingers which are here shown in the form of levers pivoted at $c$, $c'$ which carry on their opposite ends contact points. Adjacent to the contact points $d$, $d'$ are the contact points $e$, $e'$ mounted in brackets $f$, $f'$. E is a source of electricity connected by wiring $g$, $g'$ with the contact points $e$, $e'$ and also by wiring $v$, $v'$ with the solenoids S, S'. The wiring of these solenoids is also connected by suitable wiring $h$, $h'$ with the contact points $d$, $d'$ respectively. The cores of the two solenoids are connected together by a rod $i$ and are normally suspended by the spring $j$ in the neutral position shown in Fig. 35. Depending from the rod $i$ is a forked arm $k$ which engages with a stud $l$ on a bar $m$ constructed of insulating material. Pivoted to the ends of said bar $m$ are switches $o$, $o'$. The switch $o$ is electrically connected by means of suitable wiring $t$ with the negative pole of a source of electricity E' and the switch $o'$ is connected by suitable wiring $n$ with the positive pole of said source of electricity E'. $p$, $p'$ are contact points connected with one pole of the motor 44 by means of suitable wiring $r$, $r$. $q$, $q'$ are contact points connected with the other pole of the motor 44 by suitable wiring $s$. The operation of the mechanism is as follows:—If the trailing finger $b$ is depressed by the edge of the web $a$ the contact point $d$ will be forced into contact with the contact point $e$ completing the circuit in which the solenoid S is mounted. The solenoid will then be energized and its core carried toward the left until the switch $o$ is in contact with the contact point $p$ and the switch $o'$ in contact with the contact point $q'$ causing the current from the source of electricity E' to pass through the motor through the wiring $n$ switch $o'$ contact point $q'$ wiring $s$, the return circuit being through the wiring $r$ contact $p$ switch $o$ wiring $t$, causing the motor 44 to rotate and tilt the triangular folding mechanism so that the web will shift until the center line thereof again trails over the point of the folder when the contact between the contact points $d$ and $e$ will be broken, the inner end of the lever $b$ being somewhat heavier than the outer end thereof. The cores of the solenoids will then be returned by the springs $k$ to the position shown in Fig. 35 and the circuit in which the motor 44 was established, broken. If the web then shifts in the other direction the trailing finger $b'$ will be depressed and the contact point $d'$ forced into contact with the contact point $e'$ causing a current of electricity from the source E to pass through the wiring $g'$ contact point $e'$ contact point $d'$ wiring $h'$ solenoid S' and returning through wiring $v'$. This causes the solenoid S' to be energized and its core carried to the right, causing the switch $o'$ to make a contact with the switch $p'$ and the switch $o$ with the contact $q$ causing a current of electricity from the source E' to flow through the motor 44 as follows:—through the wiring $n$ switch $o'$ contact point $p'$ and wiring $r$ and to return through the wiring $s$ contact point $q$ switch $o$ and wiring $t$ causing the motor to rotate in the opposite direction and tilt the folder until the forming point thereof is again trailing over the center line of the web.

In the Fig. 34 I have shown two motors 63 but it will be understood that only one motor will be used of the type that will rotate in one direction if the current is positive and in the other direction if the current is negative.

The fabric having now been folded along its center line passes between the driven rolls 64 and 65 mounted in suitable bearings in the brackets 64$^a$ mounted on the frame 2, thence between the driven rolls 65$^a$ and 65$^b$ mounted in suitable bearings in brackets 65$^c$ supported on the frame 2, and over the idle roll 66, the ends of which are mounted in suitable bearings in the ends of bell crank levers 67 which are secured against rotation by set-screws 67$^a$ on a shaft 68 mounted in suitable bearings 68$^a$ in brackets 69 supported on the frame 2. To the other ends of the bell crank levers are secured weights 70 by means of cables 71 passing over pulleys 72 mounted on brackets 72$^a$ secured on the frame 2, the construction being such that when the travel of the web beyond this point is interrupted as will be hereafter explained, the roll 66 will be lifted by the weights 70 and the slack in the web thus taken up. From thence the folded web passes under the idle roll 73 mounted in brackets 74 supported on the frame 2 and between intermittently driven rolls 75 and 76 mounted in suitable bearings in brackets 77 secured to the frame 2. In order to regulate the pressure of these rolls upon each other and that the folded web may be firmly gripped between them, I have provided hooked bars 78 adapted to engage the ends of the rolls 75, the other ends of said hooked bars being secured to one end of spiral springs 79 the other ends of which are secured to rods 80 which pass through brackets 81 secured to the frame 2. The lower ends of the rods 80 are screw-threaded and engage with nuts 82 by means of which the tension of the springs may be regulated. Thence the web passes between two sets of intermittently driven rolls 83 and 84, 85 and 86 which are mounted in the same manner as the rolls 75 and 76. Between the two sets of rolls 75 and 76, and 83 and 84 the cutting mechanism which will be hereinafter described is mounted. The rolls 83, 84, 85 and 86 are also intermittently driven in order that the web of fabric may be stationary while the segments which are to be sewed into bags are being cut therefrom. Referring to Figs. 12 and 14 it will be seen that the segment passes over the bed 86$^a$ secured to the frame 2 and between the rolls 85 and 86 on to the intermittently driven endless belt 87 which passes around the roll 86 and the idle roll 88 mounted in suitable bearings in brackets 89 secured to the frame 2. Beneath the belt 87 is a stationary table 90 supported on brackets 91, secured to the frame 2. In order to cause the segments to travel with the belt I have provided guide rollers 92 which are mounted on levers 93.

The levers 93 are mounted to turn on a shaft 94 which is secured against rotation in brackets 95 secured to the frame 2. As shown in Fig. 12 springs 96 are coiled about the ends of the shaft 94, the outer ends of such springs being inserted into holes in said shaft, and said springs are provided at their other ends with fingers which bear against the levers 93 and tend to force the levers downward so that the guide rollers will press upon the segments and hold them firmly upon the belt 87 and compel them to travel therewith. I have also provided an adjustable stop 97 supported by rods 98 which are adjustably secured by set-screws 98$^a$ in brackets 99 supported on the frame 2. The lower surface of the stop 97 is covered with a layer of felt 100 or other suitable material, so as to insure contact between the belt 87 and the stop 97 without undue wear. When the segment of fabric has been carried forward until its outer edge is nearly in contact with the stop 97, the guide rolls are lifted as will be hereafter explained, and the segment is lined up in the correct position by the stop 97. The rotation of the rolls 75, 76, 83, 84, 85 and 86 and the travel of the belt 87 then ceases as will be hereafter explained. The segment then lies stationary on the belt 87, the folded edge thereof resting on the endless belt 101 which passes around the idle roll 102 mounted in suitable bearings in brackets 102$^a$ secured to the frame 2, and the small idle roll 103 also mounted in suitable bearings in said brackets 102$^a$ near the shifting roller 104, which is mounted in bearings in a frame 105, adapted to be moved up and down in guides 106, secured to the frame 2, by means of the link 107 and lever 108, mounted on a shaft 109 which is mounted in suitable bearings in a bracket 110 on the frame 2. The other end of the lever 108 is provided with a roller 111, which contacts with a cam 112. Secured to the shaft 109 is a crank arm 113 to the end of which is secured a spiral spring 114 which tends to force the frame 105 down in the guides 106 carrying roll 104 with it. The belt also passes over the driven roll 115 mounted in suitable bearings in brackets 115$^a$ supported on the frame 2 and under driven roll 116 and under and around the floating roll 117 which is mounted in the guides 106. The roll 116 is mounted in brackets 116$^a$ pivoted to the shaft of roll 115 in slots 116$^b$ in which is secured elastic packing 116$^c$ by means of set-screws 116$^d$. To the upper end of the bracket 116$^a$ is secured one end of a spiral spring 116$^e$ the other end of which is secured to the bracket 123 so as to force the roll 116 against the surface of the drum 128 mounted on a shaft 128$^a$ mounted in suitable bearings in brackets 128ᵇ secured to the frame 2 while the elastic packing tends to force the roll 116 against the roll 115.

In order to cause the segments to travel with and be carried forward by the belt 101, I have provided endless cords 118 which pass under the shifting gripping roll 119 over the idle roll 103 under shifting roll 104 under the driven roll 116 and over the pulleys 120, mounted on one end of the levers 121 which are pivoted on a rod 122 mounted in the brackets 123 which are mounted on the frame 2. To the other end of said levers 121 are secured weights 124 which tend to elevate the opposite ends of said levers 121 and the pulleys 120 carried thereby and take up any slack in the cords 118. The rolls 116 and 119 and the pulleys 120 are provided with grooves 125—126 and 127 which serve as guides for the cords 118. The shifting roll 119 is mounted in suitable bearings in the ends of curved levers 129 which are mounted against rotation on a shaft 130 supported in suitable bearings in two brackets 131 secured to the frame 2. To the other ends of said levers are secured springs 132, the other ends of which are secured to the brackets 123 and which tend to force the roll 119 against the roll 102. To the end of one of said levers 129 is secured one end of a cable 133 which passes over the pulley 134, under the pulley 135 and over the pulley 136, all of which are mounted on the frame 2, and is secured at its other end to the lever 137 pivoted at 138 to a bracket 139 fastened to the frame 2; the other end of said lever is provided with a roller 140 adapted to ride on a cam 141 mounted on the main driving shaft 142. The operation of this mechanism is as follows:—When the cam 141 has rotated out of contact with the roller 140 the spring 132 forces the roll 119 down on to the folded edge of the segment resting on the belt 101 and causes the segment to be carried forward by the belt 101 and the cords 118 until the segment is gripped between the rolls 115 and 116. At this moment the roller 111 which is compelled by the spring 114 to ride on the face of the cam 112 is at the point marked 112ᵃ on Fig. 4, and as the cam is rotated the roller rides to the lowest face of cam 112 and the end of the lever 108 which is secured to the frame 105 falls and carries the frame 105 down in the guides 106 carrying the roll 104 with it. As the belt 101 and the cords 118 pass under the roll 104 both are carried down by the roll 104 carrying the rear portion of the bag segment between them and as this downward movement is rapid the bag segment is quickly drawn from the belt 87 so as to be out of the way of the next segment. During this movement the roll 117 rises in the guides 106 and keeps the belt 101 taut and the levers 121 are rocked and the cords 118 are held taut by the weights 124. When the bag segment has been thus drawn down until its rear edge lies over the roll 103 the cam 112 again rocks the lever 108 and causes the frame 105 and its roll 104 to rise at a speed which permits the bag segment to be carried forward between the feed rolls 115 and 116 without moving the rear edge of said segment. When the roll 104 is at its lowest position the roll 119 is raised by the cam 141 as before described so as to permit the next bag segment to be carried by the belt 87 against the guide stop 97 and the folded edge of said segment to rest on the belt 101 about one inch to the rear of the preceding segment. The levers 93 carrying the guide rollers 92 are operated as follows:—An arm 143 is secured at one end against rotation on the shaft 130 and as this shaft is rotated so as to cause the roll 119 to press upon the forward edge of the segment which rests on the belt 101 the other end of the arm 143 is carried down and acting on the rear ends of the levers 93 lifts the guide rollers out of contact with the segment lying on the belt 87. The result is that notwithstanding the intermittent feed of the web of fabric and segments thereof between the rolls 75 and 76 and the rolls 115 and 116 from this point on the segments are carried forward at a constant speed with a space of about one inch between them.

As the segment passes between the rolls 115 and 116 the forward edge is turned upward by the rapidly rotating roll 144 which is mounted in suitable bearings in the brackets 116ᵃ. On the rear end of the roll 144 is a pulley 145 which is driven by a belt 146 from a pulley 147 secured on the shaft 481. The upturned folded edge of the segment is then caught between the roll 116, the outer face of the drum 128 and the belt 148 which passes around the drum 128, the portion of the drum about which the belt passes being reduced in diameter so that the outer surface of the belt will lie flush with the outer surfaces of the ends of the drum. The belt 148 also passes under the idle roll 149 mounted in suitable bearings in brackets 150 secured to the frame 2 and over the sewing machine beds 161 and 162 and between the needle bars 163 and 164 of the sewing machines 165 and 166, thence around the drum 151 mounted on the shaft 152 which is mounted in suitable bearings in brackets 152ᵃ supported on the frame 2 and over a guide bed 153 adjustably secured to the frame 2 so as to guide and hold the belt 148 taut. In order to compel the segments to travel with the belt 148 I have also provided narrow belts 154 and 155.

The belts 154 pass around and under the roll 116 which is recessed to receive them so that the outer surface of these belts will be flush with the surface of the roll 116 over the outer face of the drum 128 thence under the roll 149 which is similarly recessed and under and about the pulleys 156 which are mounted on the ends of arms 157 adjustably secured by set-screws 159 in the bar 158ª mounted on the bracket 158 mounted on the frame 2 and over the recessed roll 160 which is mounted in suitable bearings in the bracket 123 and through guide openings in the guide bar 169 supported on the brackets 116ª. The function of these belts 154 is to accurately guide the outer edges of the segments into the sewing machine feeding mechanism and they are rendered necessary because the belt 148 must be narrower than the width of the segments in order that it may pass between the needle bars of the sewing machines. The pulleys 156 are small in size in order that they may be placed in close proximity to the feeding mechanism of the sewing machines. It is plain that they may be adjusted to keep the belts 154 taut.

The belts 155 pass around the recessed roll 116 over the belt 148 under the recessed roll 149 about the pulleys 167 over the recessed roll 160 and through the guide openings 168 in the guide bar 169. The pulleys 167 are supported on the ends of arms 170 adjustably secured by set-screws 171 in the bar 158ª. The pulleys 167 are adjusted to keep their belts 155 taut and to insure the travel of the segments with the belt 148 to a point just beyond the needle bars of the sewing machines. As the segments pass through the sewing machines 165 and 166 the adjacent side edges of the folded segments are sewed together, the bottom of the bag being formed by the folding of the fabric over the folder 31.

The sewing machines employed may be of any well known type, and no further description of them is thought necessary. They are driven by pulleys 172 and belts 173 from friction pulleys 174, which are driven by belts 175 from the pulleys 176. The pulleys 174 and 176 are mounted on shafts 177 and 178 supported in bearings in the frame 2. From the sewing machines the bags which are joined together by the threads with which they were sewed are carried by the belt 148 under the pulleys 179 fixedly mounted on the shaft 180 which is mounted in suitable slotted bearings in the bracket 158 and insulated therefrom. The shaft 180 being so mounted in such slotted bearings as to permit it to be raised therein and to fall by its own weight. The pulleys 179 are mounted to ride on the threads 184 with which the sides of the bags are sewed as they pass over the ends of the roll 181 which is mounted directly beneath the pulleys 179 and is recessed to receive the belt 148 which passes over it. The roll 181 is mounted in suitable bearings in the bracket 158. The shaft 180 is connected with one pole of an electric circuit. Beneath each end of the shaft 180 are contact screws 182 passing through lugs 183 on the brackets 158. These contact screws are also part of the same electric circuit which is broken by the separation of the shaft 180 from the contact screws 182. If the thread is broken so that one side of the bag is not sewed when this bag passes between the roll 184 and the pulleys 179, that end of the shaft 180 which is adjacent to the unsewed side of the bag will fall and a contact will be made with its contact screw and the circuit completed, causing a current to pass from the batteries 185 through coil 186 of the magnet 187. This causes the magnet to attract the swinging arm 188 to it in which position the lower end thereof will be caught and lifted by the nose 189 on the rotating shaft 178. The other end of the arm 188 is pivotally connected to one end of a lever 190 pivoted at 191 to a bracket 192 secured to the frame 2. To the other end of the lever 190 is secured a trigger 193 which is mounted in guides 194 on a bracket 195 secured to the frame 2. A spiral spring 196 surrounds the trigger 193 the lower end of such spring seating against the upper face of the lower guide. The upper end of such spring seats against a set-ring 197 secured to the trigger 193. The set-ring 198 is secured to the trigger 193 below the lower guide to limit the upward movement of the trigger. The spring 196 tends to maintain the trigger in the position shown in Fig. 21 that is with the set-ring 198 against the lower guide and the upper end of the trigger 193 engaged with the collar 199 loosely mounted on the rod 200. The rod 200 is mounted in guide brackets 201 and 202 secured to the frame 2 so as to be longitudinally movable therethrough and is provided at the end on which the collar 199 is mounted with a set-ring 203. A spring 204 is coiled about the rod 200 one end of which seats against the collar 199 and the other end against the guide bracket 201. Set-rings 205 and 206 are secured to the rod 200 for the purpose of limiting the movement of rod 200 through the guide brackets 201 and 202. A lever 207 is secured at its lower end against rotation on one end of a rod 208 rotatably mounted in brackets 209 secured to the floor. The upper end of the lever at 210 is suitably shaped to be grasped by the hand and is provided with a slot 211 which engages with a pin 212 which passes through the bar 200. The other end of the rod 208 passes through the lower end of the arm 213 and is locked against rotation therein by the set-screws 214. The upper end of the arm 213 is provided with a slot 215 which engages with a pin 216 on the rod 217 which is longitudinally movable in guide brackets 218 secured to the frame 2. To the outer end of the rod 217 are secured fork fingers 219 between which the belt 220 from the motor 221 runs and by which fork fingers the belt 220 is shifted from the idle or loose pulley 223 to the active or fixed pulley 222 by means of the lever 207, rod 208 and arm 213 when the operator desires to start the machine and from the pulley 222 to the pulley 223 when the operator desires to stop the machine. The belt 220 is automatically shifted from the active pulley 222 to the loose or idle pulley 223 whenever the trigger 193 is tripped as before described. The spring 204 will then shift the rod 200 and the lever 207 to the right causing the rod 208 to be rotated and the upper end of the arm 213 to swing toward the right carrying the rod 217 with its fork fingers 219 with it and causing the belt 220 to be shifted from the fast or active pulley 222 to the idle or loose pulley 223 and the machine to stop. When the circuit is again broken the lever 188 returns to its normal position as shown in Fig. 21, the lower end thereof resting against the stop 188ª secured to the frame 2.

When the machine has been automatically stopped it may again be started by manually shifting the lever 207 to the left which will cause the spring 204 to be compressed and the collar 199 to be shifted beyond the trigger 193 when the trigger will again be set as shown in Fig. 21. The collar 199 being loose on the rod 200 it is plain that the rod 200 may be freely shifted through the collar 199 by the manipulation of the lever 207. I have also provided additional automatic mechanism for stopping the machine, when either of the threads running to either of the sewing machines breaks. As the mechanism applied for this purpose to each sewing machine is identical one mechanism will be described.

Mounted on a spindle 224ª supported on a bracket 224ᵇ secured to the frame 2 is a spool 224 from which a thread 225 is carried through an eye 226 on the upper end of an arm 227 supported on the frame 2, through an eye 228 on a bar 229 supported on the frame 230 of the sewing machine, between tension disks 231 and 232 which are mounted on a stud 233 which is constructed from non-conducting material and the inner end of which is secured in the frame 230.

Coiled about the stud 233 is a spring 234 the inner end of which presses against the disk 231 and the outer end against a nut 235 mounted on the outer end of the stud 233. By the adjustment of the nut 235 the tension of the spring 234 may be regulated. Each of the disks 231 and 232 forms part of an electric circuit which is broken by the disks being held out of contact with each other by the thread 225 which passes between them and from thence to the needle of the sewing machine. When the thread 225 is broken the disks 231 and 232 are forced into contact with each other by the spring 234, the circuit is completed and a current from the battery 185 passes through the coil 186 which causes the trigger 193 to be tripped and the belt 220 to be shifted from the fast or active pulley 222 to the idle or loose pulley 223 and the machine to stop as previously described. Mounted on a spindle 236 supported on a bracket 237 secured to the frame 2 is a second spool 238 from which a thread 239 runs through an eye 240 in a bracket 241 secured to the frame 2 and thence through the eye 242 on the bar 229 and between disks 243 and 244 mounted in the same manner as the disks 231 and 232 but on a stud 246 mounted on the opposite side of the sewing machine frame 230. From thence the thread 239 passes to the looper of the sewing machine. When the thread 239 is broken the disks 243 and 244 are forced into contact with each other by the spring 245, and the machine is stopped in the same manner as when the thread 225 has been broken as hereinbefore described. After passing under the pulleys 179 the bag continues to travel with the belt 148 and passes under the idle roll 247 which is mounted in suitable bearings in lower ends of curved arms 248 the upper ends of which are secured against rotation to a shaft 249 mounted in suitable bearings in the brackets 158. Springs 250 are secured at one end to the arms 248 and at the other end to the bracket 158 and tend to force the roll 247 toward the drum 151 and cause the roll 247 to firmly grip the bag on the belt 148 and the outer faces of the drum 151 and compel the bag to travel with the belt and drum, thus overcoming any uncertainty or difference in the feed of the sewing machines. From thence the bags secured together by the threads with which they are sewed pass to the cutting mechanism which consists of a bed plate 251 secured to brackets 253 secured to the frame 2. To the front edge of the bed plate 251 is adjustably secured a plate 254 having a knife edge which lies close to the belt 148 and the outer faces of the drum 151 adjacent to the belt so as to cause the bags to feed on to the bed plate 251. This plate 254 is provided with slots 255 through which pass screws 256 by which the same is adjustably secured to the bed plate 251. Slots 257 are formed in the bed plate 251 in the rear upper edges of which cutting blades 258 are laid. Cutting knives 259 are secured to shafts 260 which are mounted in suitable bearings in brackets 261 secured to the bed plate 251 and are retained in such bearings by set-rings 262 secured to the lower ends thereof and by the bevel gears 263 secured to the upper ends thereof which bevel gears 263 are adapted to mesh with corresponding bevel gears 264 secured against rotation on a shaft 265, mounted in suitable bearings 266 in the brackets 253. On one end of the shaft 265 is secured a fixed pulley 267 and a loose pulley 268 driven by a belt 268ᵃ from a pulley 268ᵉ on the shaft 177. Coiled about the shaft 265 is a spring 269 one end of which abuts against the loose pulley 268 and the other end against a set-ring 270 secured by a set-screw 271. On the other end of the shaft 265 is a pulley 272 mounted against rotation and provided with a stop 273 adapted to engage with a downwardly and inwardly turned nose 274 on the end of a rod 275 which is so mounted in guide brackets 276, 277 and 278 as to be longitudinally movable therethrough.

Coiled about the rod 275 is a spring 279 one end of which abuts against the guide bracket 277 and the other end against a setring 280 secured to the rod 275. Mounted on the shaft 281 is a nose 282 which on each revolution of the shaft shifts the rod 275 longitudinally to the right until the nose 274 has been shifted out of engagement with the stop 273. The shaft 265 being then free to rotate it is caused to make one revolution and through the gears 264 and 263 produces one revolution of the shaft 260 which causes the cutting blades 259 to be revolved and pass through the slots 257 and sever the threads which secure the bags together the cutting edges of the blades 259 shearing the threads against the cutting edges 258. Before the shaft 265 can make another revolution the spring 279 has returned the rod 275 to its normal position with the nose 274 in position to contact with the stop 273 and lock the shaft against rotation until the mechanism is again tripped. While the mechanism is locked the idle pulley 268 turns on the shaft 265 and slips over the adjacent face of the fixed pulley 267 the friction between the adjacent faces of these pulleys as regulated by the tension of the spring 269 being sufficient to insure the rotation of the shaft 265 when the locking mechanism is released. The shaft 281 is driven at a speed which causes it to make one complete revolution to each bag passing over the bed plate 251 and by properly adjusting the nose 282 on the shaft 281 by means of the set-screw 282ᵃ the cutters are caused to act at the moment when the threads are passing over the slots 257.

As the bags are separated from each other as described they fall by gravity and slide over the face of the plate 283 until the bottom edges of the bags rest on the stop 284 secured to the face of the plate 283, which swings on pivots 285 in bearings 286 in the brackets 287 secured to the floor by screws 288. Arms 289 project from the plate 283 which are pivoted at their ends to a yoke 290. To the yoke 290 is attached a rod 291 by means of a closed hook 292 on the end thereof, the other end of the rod 291 is pivoted to the lower end of a lever 293, which is pivoted at 294 to the bracket 295 which is secured to the frame 2. On the upper end of the lever is mounted a roller 296 adapted to engage with a cam 297 mounted on and secured by a set-screw 298 to the shaft 281. One end of a spring 299 is secured to the back of the plate 283 and the other end to a bracket 300 secured to the frame 2. This spring serves to hold the plate 283 against the stop 301 mounted on the frame 2. The adjustment and rotation of the cam 297 is such that when a bag has fallen until it rests on the plate 283 against the stop 284 the cam 297 will rock the lever 293 and move the rod 291 to the left and swing the plate 283 on the pivots 285 so that the bag will be deposited on the table 302 at which time the roller 296 on the upper end of the rod 293 will be released from the cam 297 and the spring 299 will return the parts of the mechanism to the positions shown in Fig. 6.

The table 302 is provided with four legs 304 which pass through guide openings 303 in a plate 305 which is provided with feet 306 secured to the floor. Surrounding each of the legs 304 are springs 307 the lower ends of which abut against the upper face of the plate 305 and the upper ends against the lower face of the table 302. Depending from the center of the table 302 is a rack 308 and secured to the upper face of the plate 305 is a pawl 309 which is held in engagement with said rack 308 by the spring 310. The rack 308 passes through an opening 311 in the plate 305 and to the lower end of the rack is secured a stop 312 which prevents the springs 307 from raising the table 302 so high as to remove the legs 304 out of the guide openings 303 in the plate 305. As the bags are piled as described on the table 302 the table is gradually pressed down by the swinging plate 283 and held in position by the pawl 309.

In Figs. 5 and 5ᵃ I have shown a modification of the mechanism for disposing of the bags as they are delivered by the machine. This modification consists of a roll 313 mounted in slots 314 in the upper ends of arms 315 of a frame 316 which is pivoted at 317 to brackets 318, secured to the floor by screws 319. One end of a spring 320 is secured to the frame 316 at 321 and the other end of the spring is secured to a bracket 322 fastened to the frame 2. This spring serves to hold the roll 313 against the belt 148 and the end portions of the drum 151. The bags are secured together by the threads with which they are sewed and are wound on the roll 313 the roll being rotated by contact with the belt 148 and drum 151.

I will now describe the mechanism by which the various parts of the machine are driven from the motor 221. As previously described a loose or idle pulley 222 and a fast or active pulley 223 are mounted on the shaft 323 which is mounted in suitable bearings 223ª in the frame 2 and the outer end of which is mounted in a bearing 324 in a bracket 325 which is secured to the floor by screws 326. The pulleys 222—223 are driven by a belt 220 from the pulley 327 mounted on the shaft of the motor 328. Mounted against rotation on the shaft 323 are two cone pulleys 329 and 330. As this part of the mechanism is duplicated I will only describe one of the mechanisms as the other duplicate thereof is constructed and operates in the same manner. Passing about the pulley 330 is a belt 331 which also passes over a reverse cone pulley 332 mounted on a shaft 333. One end of the shaft 333 is mounted in a suitable bearing in a bracket 334. The shaft 333 is also supported in a bearing 335 in the frame 2. On the other end of said shaft is mounted a worm gear 336 which meshes with a gear 337 mounted on a stud 338 secured to the frame 2. Another gear face 339 on the gear 337 meshes with a gear 340 which is mounted on a shaft 341. The shaft 341 is mounted in suitable bearings 342—343 in brackets 344—345 secured to the frame 2. Mounted on the shaft 341 is a bevel gear 346 which meshes with a bevel gear 347 mounted on the end of a shaft 348 which is mounted in suitable bearings 349 in brackets 350 secured to the frame 2. On the other end of the shaft 348 is mounted a bevel gear 351 which meshes with a bevel gear 352 mounted on the end of the driven roll 11. Also secured on the end of said driven roll 11 is a spur gear 353 which meshes with a spur gear 354 mounted on the end of the driven roll 10. On the rear end of the shaft 341 is mounted a bevel gear 355 which meshes with a corresponding bevel gear 356 mounted on the end of the roll 65. On the other end of the shaft 341 is mounted a bevel gear 357 which meshes with a corresponding bevel gear 358 on the end of the roll 65$^b$. Mounted on the end of the roll 65$^b$ is a spur gear 359 shown in Fig. 28 which meshes with a corresponding spur gear 360 mounted on the roll 65$^a$. Mounted near the end of the roll 65 is a spur gear 361 which meshes with a corresponding spur gear 362 mounted on the roll 64. From this description it will be seen that the feed rolls 10, and 11—64 and 65—65$^a$ and 65$^b$ which draw the web of cloth from the roll 1 over the stretching rods and rollers and through the printing press and through the rolls 65$^a$—65$^b$ are all driven from the cone pulley 330.

The printing rolls 21 and 24, the cutting device and the mechanism which feeds the segments cut therefrom to the sewing machines and disposes of the bags after they have been sewed are all operated by positive gears and at a definite ratio of speed with relation to the speed at which the shaft 323 rotates.

I have found in practice that it is impossible to feed the web of cloth through the printing press to the cutter by means of rolls which were driven at a pre-determined speed and at a definite ratio with reference to the speed of the rolls and other mechanism which feed the segments cut from the web to the sewing machine and delivery mechanism on account of the irregular stretching of the web between the roll 1 and the cutting mechanism which would otherwise cause the impressions of the printing press to be improperly spaced on the bag segments. In order to overcome this difficulty I have provided means for varying the travel of the web from the roll 1 to the cutting device which compensates for any lack of uniformity in the stretching of the web by shifting the belt 331 to the left on the pulleys 330 and 332 whenever the web stretches unduly, and to the right whenever the travel of the web between the roll 1 and the cutting device should be increased to produce the proper spacing of the printed matter on the segments. The stretching of the web and the travel of the web from the roll 1 to the rolls 65$^a$ and 65$^b$ is accurately determined and measured by the lifting of the roll 66 which when raised to its full height takes up the slack in the web between the rolls 65$^a$ and 65$^b$ and 75 and 76 and as the slack so taken up by the lifting of the roll 66 should amount to the width of exactly one bag segment, it is apparent that if the web is being fed too rapidly by the rolls 65$^a$ and 65$^b$ so that the slack in the web amounts to more than the width of one segment that the roll 66 will be raised above its normal highest point and that if the web is being fed too slowly the roll 66 will be prevented from rising to its normal highest position and on the return movement will be carried below its normal lowest position. It is therefore apparent that whenever the travel of the web from the roll 1 through the printing press over the folder and through the feeding rolls 65$^a$ and 65$^b$ is at the proper speed the roll 66 will while the intermittent rolls 75 and 76 are stationary be lifted to a predetermined point.

In order to regulate the travel of the web from the roll 1 to the rolls 65$^a$ and 65$^b$ I have provided the following mechanism, namely:—An arm 363 is secured at one end of the shaft 68 by a set-screw 364. The other end of the arm 363 is slotted to receive a rod 365. The upper end of the rod 365 is screw-threaded and mounted thereon are stop-nuts 366 and 367. The rod 365 also passes through a guide opening 368 in a bracket 369 secured to the frame 2. The lower end of the rod 365 is pivoted to one end of an arm 370 the other end of which is secured to a shaft 371 by a set-screw 372, the shaft 371 being mounted in suitable bearings in brackets 373 and 374 secured to the frame 2. Also secured to the shaft 371 by a set-screw 375 is a curved arm 376 the other end of which is provided with an opening through which passes a lever 377 one end of which is pivoted at 378 to a bracket 379 on the frame 2. To the other end of the lever 377 is pivoted a belt guide 380 adapted to engage with the belt 331. The construction of this mechanism is such that whenever the slack in the web between the rolls 65$^a$ and 65$^b$ and 75 and 76 is equal to the width of one bag segment the roll 66 will rise but the rear end of the lever 363 will not be depressed sufficiently to contact with the stop-nuts 367 and when the roll 66 again falls the end of the lever 363 will not contact with the stop-nuts 366 the feed of the web then being normal. If however the feed of the web is faster than the normal feed the roll 66 will rise above its normal highest position and the end of the lever 363 will be forced downward and into contact with the stop-nuts 367 and carry the rod 365 below its normal position which will cause the end of the arm 370 to be rocked downward rotating the shaft 371 which will rock the arm 376 the lever 377 and cause the belt 331 to be shifted to the left which results in a reduction in the travel of the belt 331 and consequently in a slower rotation of the rolls which feed the web from the roll 1 through the printing press to the rolls 75 and 76. When the rolls 75 and 76 are again rotated and the slack in the web between them and the rolls 65$^a$ and 65$^b$ is taken up the roll 66 is again carried down by the web, and if the slack in the web is less than the normal amount it is apparent that the roll 66 will be carried below its normal lowest position which will cause the rear end of the arm 363 to contact with the stop-nuts 366 and raise the rod 365 rock the arms 370 and 376 and the lever 377 and shift the belt 331 to the right which will cause it to travel at an increased speed and thus increase the speed at which the web is fed to the rolls 75 and 76.

I have found in practice that the mechanism described accurately compensates for any lack of uniformity in the stretching of the web or the feed thereof through the printing press and to the cutting mechanism. In order to properly stretch the web, and to keep it taut while passing from the roll 1 to the feed rolls 65$^a$ and 65$^b$, I have found it necessary to construct each set of feed rolls namely 10 and 11, 64 and 65 and 65$^a$ and 65$^b$ all of which rotate at the same speed of progressively increasing diameters. The rolls 64 and 65 being of slightly greater diameter than the rolls 10 and 11 and the rolls 65$^a$ and 65$^b$ being of slightly greater diameter than the rolls 64 and 65. I will now describe the mechanism by which the printing rolls 21 and 24 are operated. Mounted on the shaft 323 is a gear 381 which meshes with a larger gear 382 mounted on a shaft 383 mounted in suitable bearings 383$^a$ on the frame 2. Also mounted on the shaft 383 is a small gear 384 which meshes with a larger gear 385 mounted on the shaft 142. Also mounted on the shaft 142 is a bevel gear 386 which meshes with a bevel gear 387 mounted on the end of a shaft 388 which is supported in suitable bearings 389 and 390 in brackets 391 and 392 supported on the frame 2. On the other end of the shaft 388 is mounted a bevel gear 393 adapted to mesh with a bevel gear 394 on a shaft 395 mounted in suitable bearings 396, 397 and 398 in suitable brackets 399, 400 and 401, all secured to the frame 2. On the other end of the shaft 395 is mounted a bevel gear 402 which meshes with a corresponding bevel gear 403 mounted on the end of the shaft 404 supported in bearings 405 and 405$^a$ in brackets 406 and 406$^a$ secured to the frame 2. Mounted on the shaft 404 is a spur gear 407 adapted to mesh with a corresponding gear 408 on the shaft 409 of the printing roll 21. Mounted on the shaft 410 of the roll 24 is a spur gear 411 adapted to mesh with the gear 408. The reductions of speed by means of the gears mentioned is such that the surface of the printing roll will travel at substantially the same speed as the speed of the web which is drawn between them as previously described.

I will now proceed to describe the mechanism by which the intermittent feed rolls 75—76, 83—84 and 85—86 are driven. Mounted on the shaft 142 is a gear 412 which meshes with a gear 413 mounted on a stud 414 mounted in the frame 2. Secured to the outer face of the gear 413 by bolts 415 is a crank arm 416 which is provided at its outer end with a slot in which is adjustably mounted a block 417 carrying a crank pin 418. The outer end of the crank arm 413 is provided with an opening which is screw-threaded to receive a stud 419. The stud 419 also passes through the block 417 and is provided with stop-rings 420 which secure the block 417 on the stud 419 and yet permits the stud 419 to turn freely in said block. The position of the block 417 is adjusted by the rotation of the stud 419 and when adjusted is locked in position by means of the lock-nut 421. A connecting rod 422 is connected to the pin 418 at one end and at the other end to a crank pin 423 mounted in the end of a crank arm 424 the other end of which is mounted on a stud 425 which is mounted in and secured to the frame 2. The arm 424 is free to turn on said stud 425. Also mounted on the stud 425 is a spur gear 426 and a ratchet gear 427. The gears 426 and 427 are secured to each other by bolts 428. The connecting rod 422 is also provided with a pawl 429 which is held in contact with the ratchet teeth by a spring 430. The gear 426 meshes with the gear 431 mounted on the end of roll 76 and with the gear 432 mounted on the end of the roll 84. The gear 431 meshes with a gear 433 mounted on the end of the roll 75 and the gear 432 meshes with a gear 434 mounted on the end of the roll 83. Mounted on a stud 435 secured in the frame 2 is a gear 436 which meshes with a gear 437 mounted on the end of the roll 84. The gear 436 also meshes with a gear 438 mounted on the end of the roll 86 and the gear 438 meshes with a gear 439 mounted on the end of the roll 85. With each revolution of the gear 413 the crank arm 416 also revolves imparting a reciprocating motion to the connecting rod 422. On the forward motion of the connecting rod 422 the pawl 429 engages with the teeth of the ratchet wheel 427 and imparts a partial rotation to the same with each movement of the connecting rod 422. On the return movement of the connecting rod 422 the pawl 429 rides over the teeth on the ratchet wheel 427. It will thus be seen that the rotation of the gear 426 and of the rolls which are driven thereby is intermittent and the drive is so regulated that the width of one bag segment will be fed through rolls 75—76, 83—84 and 85—86 with each forward movement of the connecting rod 422. It will also be seen that the length of the stroke of the connecting rod 422 may be regulated by adjusting the crank pin 418 and its block at any desired point in the crank arm 416 in order to provide for cutting off segments of different widths.

The diameter of the rolls 83—84 is slightly greater than the diameter of the rolls 75—76 and the diameter of the rolls 85—86 is slightly greater than the diameter of the rolls 83 and 84 which causes the web to be tightly stretched between these sets of rolls in order that the segments may be easily and uniformly severed from the web. The cutting device is mounted between rolls 75 and 76, and 83 and 84 and consists of a cutting disk 440 provided with a sharp cutting edge mounted on a shaft 441 which is mounted in suitable bearings in a carriage 442. The frame of the cutter is supported on guide rods 443—444. The ends of the guide rods pass through suitable openings in brackets 445 and 445ª which are mounted on and secured to the arms 446 and 446ª which are bolted to the brackets 77. The rods are secured in the brackets 445 by means of pins 447. Coiled about each of the rods 443—444 at each end thereof are buffer springs 448. The rods 443—444 pass through openings 449 in the carriage frame 442 and the carriage is longitudinally movable on the guide rods 443—444 across the web. It is shifted from one side of the machine to the other by means of a cable 450 which is secured to a bracket 451 mounted on the frame of the carriage. This cable passes around a pulley 452 mounted on a stud 453 secured in the arm 446ª over a pulley 454 mounted on a stud 455 secured in the arm 446 around a pulley 456 mounted in a block 457 around a pulley 458 mounted on a stud 455 and around a pulley 459 mounted in the block 457 and the end thereof is secured to the arm 446. The other end of the cable passes around a pulley 460 mounted on a stud 461 secured in the arm 446 around a pulley 462 mounted in a block 463 around a pulley 464 mounted on the stud 461 around a pulley 465 mounted in the block 463 and the end thereof is secured to the arm 446. A lever 466 is secured at one end to the block 457 and at the other end is pivoted to a bracket 467 on the frame 2. A lever 468 is secured at one end to the block 463 and at the other end is pivoted to the bracket 467. Near the center of each of said levers are pivoted rolls 469 and 470 which are adapted to contact with cams 471 and 472 mounted on the shaft 142.

Whenever the lever 468 is depressed by the cam 471 the carriage 442 is shifted by means of the cable 450 across the web from left to right, and whenever the lever 466 is depressed by the cam 472 the carriage and cutter are shifted across the web from right to left, and whenever one of said levers is depressed by its cam the other lever is lifted and its roll held against the face of its cam by the cable 450.

The cutting disk 440 is rotated as follows:—A pulley 473 is mounted on the shaft 441 against rotation as is also the cutting disk 440. Idle pulleys 474 and 475 are mounted on studs 476 and 477 supported in the carriage frame 442. An idle pulley 478 is mounted on a shaft 479 secured to the bracket 445 by screws 480. Mounted on the shaft 481 and secured against rotation thereon is a pulley 483. The shaft 481 is mounted in suitable bearings on arms 446ª. Mounted on one end of the shaft 481 is a pulley 484 which is driven by a belt 485 from a pulley 486 mounted on the shaft 178.

A belt 487 passes around the pulley 483 under the pulley 477 over the pulley 473 under the pulley 474 and around the pulley 478 and by means of this belt the disk 440 is rotated. The pulleys 473, 474 and 475 being so mounted as to cause the belt to bear with the desired pressure upon the upper surface of the pulley 473. Mounted on the frame 2 is a bed plate 488 which lies just beneath the web of fabric with a slot 489, the rear lip of which is ground to a cutting edge 490. The cutting disk 440 is so mounted in its carriage frame 442 that the lower edge of the cutting disk lies in the slot 489 and the rear face of the cutting disk abuts against the cutting edge 490 on the bed 488. As the carriage 442 with its cutting disk 440 is shifted across the web of fabric the fabric is cut or sheared between the disk 440 and the cutting edge 490 the web being supported during the cutting operation on the bed 488. The end of the severed fabric is then forced forward over the bed plate 488 by the rolls 75 and 76, the forward edge of the slot 489 being slightly lower than the rear cutting edge thereof in order that the severed edge of the fabric may not catch thereon until it is gripped by the rolls 83 and 84, from which point it is carried forward as heretofore explained. Mounted on the shaft 142 is a bevel gear 491 which meshes with and drives a bevel gear 492 on the end of the shaft 281. The shaft 281 is mounted in bearings 515 and 516 in brackets 517 and 518 secured to the frame 2. Mounted on the shaft 281 is a spur gear 493 which meshes with and drives a gear 494 mounted on a stud 495 which is supported in a bracket 496 mounted on the frame 2. To one face of the gear 494 is secured by the bolts 497 the cam 112 previously described. Mounted on the outer end of the shaft 323 is a bevel gear 498 which meshes with a corresponding bevel gear 499 mounted on the end of the shaft 178. The shaft 178 is mounted in a bearing 500 in a bracket 501 secured to the floor by bolts 502 and in a bearing 503 in the frame 2. On the shaft 178 is also mounted a pulley 504 which by means of the belt 505 drives a pulley 506 mounted on a shaft 507 mounted in a suitable bearing in a bracket 508 secured to the frame 2. Also mounted on the shaft 507 is a spur gear 509 which meshes with a corresponding gear 510 mounted on the shaft 511 of the roll 115. On the same shaft is also mounted a spur gear 513 shown in dotted lines on Fig. 11. The gear 513 meshes with a corresponding gear 512 mounted on the shaft 514 of the roll 116.

Claims:

1. A bag machine including in combination means for feeding a web of fabric from a roll, means for stretching the web, a printing press for producing impressions in colored matter upon the fabric, means for folding the fabric, means beyond the stretching means, printing press and folding means for feeding the fabric with a continuous feed, means for arresting the travel of a section of the web, means for automatically taking up the slack in the web, means for automatically stretching taut a section of the web, means for cutting segments from the taut section of the web, and means for stitching the edges of the segments together.

2. A bag machine including in combination means for feeding the web of fabric from a roll, means for stretching the web, a printing press for producing impressions in colored matter upon the fabric, means beyond the stretching means and printing press for feeding the fabric with a continuously driven feed, means for automatically regulating the feed of the fabric through the stretching means and beyond the printing press so as to compensate for any uneven stretching of the fabric, means for arresting the travel of the fabric beyond the printing press and severing the segments therefrom.

3. A bag machine including in combination a folder, means for drawing a web of fabric over the former point of the folder and automatic means for causing the former point of the folder to trail over the center line of the fabric and means for cutting off bag sections from the web and means for stitching such bag segments.

4. A machine adapted to make bags from a web of fabric including in combination printing mechanism, continuously driven rolls constituting means for feeding the fabric through the printing press, intermittently driven mechanism for feeding the fabric to and beyond the cutting mechanism, cutting mechanism constituting means for cutting bag segments from the web, folding mechanism constituting means for folding the bag segments, sewing mechanism adapted to sew the bag segments and automatic means adapted to regulate the speed of the rolls which feed the web through and beyond the printing press.

5. A bag machine adapted to make bags from a web of fabric including in combination a movable folder having a former or folding point, automatic mechanism for moving said folder so as to maintain the folding point at the center line of said web of fabric and means for cutting bag segments from said web and means for stitching the same.

6. A bag machine adapted to make bags from a web of fabric, including in combination folding means, means for constantly feeding the web past the folding means, a series of intermittently driven rolls, constituting means for stretching the folded fabric and holding it stationary, cutting mechanism, constituting means for severing bag segments from the web at a point positioned between said intermittently driven rolls, and stitching mechanism adapted to stitch such bag segments.

7. A bag machine adapted to make bags from a web of fabric, including in combination folding mechanism, feeding mechanism adapted to feed the web of fabric to cutting mechanism, cutting mechanism, constituting means for cutting bag segments from said web, constantly driven feeding mechanism, constituting means for feeding the segments laterally from the line of travel of the web, vertically movable mechanism adapted to press upon the segments and compel them to travel with the laterally feeding mechanism, and stitching mechanism adapted to secure the edges of the bag segments together.

8. A bag machine adapted to make bags from a web of fabric, including in combination folding mechanism adapted to feed the web of fabric to cutting mechanism, cutting mechanism adapted to cut bag segments from said web, constantly driven feeding mechanism, constituting means for feeding the segments laterally from the line of travel of the web, vertically movable gripping mechanism adapted to press upon the segments and compel them to travel with the feeding mechanism, shifting rolls adapted to carry the rear end of the bag segments out of the path of travel of the folded segments, and stitching mechanism adapted to stitch the edges of said bag segments.

9. A bag machine adapted to make bags from a web of fabric, including in combination folding means, means for constantly feeding the web past the folding means, a series of intermittently driven rolls, constituting mechanism for feeding the web to cutting mechanism, cutting mechanism adapted to sever bag segments from the web, constantly driven feeding mechanism, constituting means for feeding the segments to sewing mechanism, automatically shiftable rolls, constituting means for carrying the rear end of each bag segment out of the line of travel of each succeeding segment and sewing mechanism adapted to stitch the bag segments.

In testimony whereof, I have signed my name to this specification, in the presence of two subscribing witnesses.

ROBERT H. PLASS.

Witnesses:
WILLIAM L. TIERNEY,
E. A. PEARCE.